US009904687B2

(12) United States Patent
Arikawa et al.

(10) Patent No.: US 9,904,687 B2
(45) Date of Patent: Feb. 27, 2018

(54) STORAGE APPARATUS AND DATA MANAGEMENT METHOD

(71) Applicants: Hitachi, Ltd., Tokyo (JP); Hitachi Information & Telecommunication Engineering, Ltd., Yokohama-shi, Kanagawa (JP)

(72) Inventors: Hidehisa Arikawa, Kanagawa (JP); Naomitsu Tashiro, Kanagawa (JP); Mikito Ogata, Kanagawa (JP)

(73) Assignees: Hitachi, Ltd., Tokyo (JP); Hitachi Information & Telecommunication Engineering, Ltd., Kanagawa (JP)

( * ) Notice: Subject to any disclaimer, the term of this patent is extended or adjusted under 35 U.S.C. 154(b) by 461 days.

(21) Appl. No.: 14/760,289

(22) PCT Filed: Feb. 13, 2013

(86) PCT No.: PCT/JP2013/053417

§ 371 (c)(1),
(2) Date: Jul. 10, 2015

(87) PCT Pub. No.: WO2014/125582

PCT Pub. Date: Aug. 21, 2014

(65) Prior Publication Data

US 2015/0356109 A1 Dec. 10, 2015

(51) Int. Cl.
*G06F 17/00* (2006.01)
*G06F 17/30* (2006.01)
(Continued)

(52) U.S. Cl.
CPC ........ *G06F 17/30153* (2013.01); *G06F 3/061* (2013.01); *G06F 3/0608* (2013.01);
(Continued)

(58) Field of Classification Search
CPC ......... G06F 17/30156; G06F 17/30371; G06F 17/30303; G06F 17/30575; G06F 11/1453; G06F 3/0641
See application file for complete search history.

(56) References Cited

U.S. PATENT DOCUMENTS 8,849,768 B1 * 9/2014 Agrawal .......... G06F 17/30147 707/664
9,817,832 B1 * 11/2017 Protopopov ...... G06F 17/30082
(Continued)

FOREIGN PATENT DOCUMENTS

JP 2011-191933 A 9/2011

OTHER PUBLICATIONS

Computerworld. jp, Hitachi Seisakusho, Enhancement of a file storage for backup application,—"allowing to select a de-duplication mode from among three kinds of de-duplication modes", [online], Japan, Oct. 12, 2012, [Search date: Apr. 10, 2013] Internet <URL: http://www.computerworld.jp/common/print/news/205152>, URL, http://www.computerworld.jp/common/print/news/205152 Concise explanation is provided as a part of English Translation of the Japanese Office Action.
(Continued)

*Primary Examiner* — Dung K Chau
(74) *Attorney, Agent, or Firm* — Volpe and Koenig, P.C.

(57) ABSTRACT

The present invention relates to a storage apparatus that executes de-duplication processing. Specifically, a storage apparatus includes a storing apparatus configured to provide a first storage area and a second storage area and a control unit. The control unit determines, on the basis of a result of comparison of a compression ratio of compressed data with a threshold, whether first duplication determination for determining whether data same as the data compressed without being stored in the first storage area is stored in the second storage area is executed or second duplication deter-
(Continued)

Host apparatus
Backup data
200
Primary de-duplication
100
Storage apparatus
Determine threshold
First file system
Second file system
Secondary de-duplication mination for determining whether data same as the data compressed after being stored in the first storage area is stored in the second storage area is executed. Further, the control unit changes the threshold on the basis of a state of the storage apparatus.

13 Claims, 16 Drawing Sheets

(51) Int. Cl.
*G06F 12/00* (2006.01)
*G06F 3/06* (2006.01)
*G06F 11/00* (2006.01)

(52) U.S. Cl.
CPC .......... *G06F 3/0641* (2013.01); *G06F 3/0689* (2013.01); *G06F 11/00* (2013.01); *G06F 12/00* (2013.01); *G06F 17/30156* (2013.01)

(56) References Cited

U.S. PATENT DOCUMENTS

2011/0145523 A1 6/2011 Gupta et al.
2011/0225130 A1 9/2011 Tokoro
2011/0289281 A1 11/2011 Spackman
2012/0016839 A1* 1/2012 Yueh .................. G06F 11/1435 707/624
2012/0023292 A1* 1/2012 Saito ..................... G06F 1/3203 711/114
2013/0282672 A1* 10/2013 Tashiro ................ G06F 3/0608 707/692

OTHER PUBLICATIONS

Keith Brown, technology director in charge, NetApp, "De-duplication of backup stream data by NetApp VTL", [online], Japan, 2009, [Search date: Apr. 10, 2013] Internet, <URL: http://www.netapp.com/jp/communities/tech-ontap/tot-vtl-dedupe-0902-ja.aspx>, URL, http://www.netapp.com/jp/communities/tech-ontap/tot-vtl-dedupe-0902-ja.aspx Concise explanation is provided as a part of English Translation of the Japanese Office Action.

Computerworld.jp, Hitachi Seisakusho, Backup Yoto Muke File Storage o Kyoka—3 Shurui no Chofuku Haijo Mode kara Sentaku Kano ni, [online], Oct. 12, 2012 (Oct. 12, 2012), [retrieval date Apr. 10, 2013 (Apr. 10, 2013)], Internet , URL: http://www.computerworld.jp/common/print/news/205152>.

Keith Brown, Technology Tanto Director, NetApp, NetApp VTL ni yoru Backup Data Stream no Chofuku Haijo, [online], 2009, [retrieval date Apr. 10, 2013 (Apr. 10, 2013)], Internet <URL:http://www.netapp.com/jp/communities/tech-ontap/tot-vtl-dedupe-0902-ja.aspx>.

Kazuhiko Hoshiba, "Tettei Shuzai Chofuku Haijo Backup Storage Data—ryo ga 10 Bun no 1 Ika ni Saigai Taisaku de Needs Kakudai", Nikkei Computer, May 10, 2012 (May 10, 2012), No. 808, pp. 88-91.

* cited by examiner

Host apparatus
200
100
Storage apparatus
101
1011
101a
101b
101n
Virtual server
CPU
102
System memory
103
HDD
104
FC port
105
FC cable
106
107
FC port
CTL0
CTL1
110
111
HDD
Disk array apparatus
LU0
LU1

| Table | Content |
| --- | --- |
| Stub file (121) | Link of backup data and content ID |
| Chunk data set (122) | User data |
| Chunk data set index (123) | Chunk information in chunk data set |
| Content management table (124) | Chunk information in content |
| Chunk index (125) | Chunk data set information in which chunk is present |

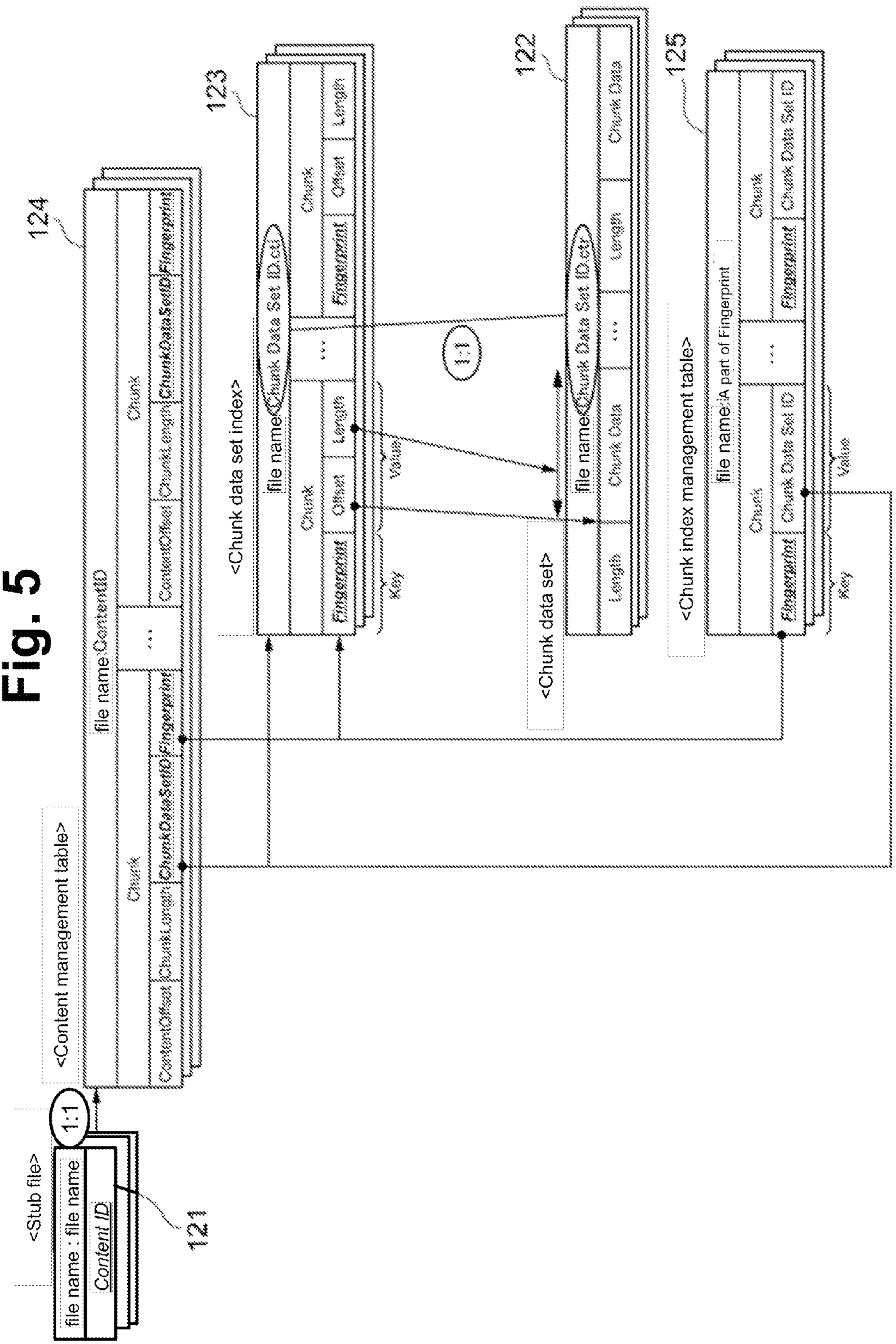
Fig. 5
<Stub file>
file name : file name
Content ID
121
1:1
<Content management table>
file name:ContentID
Chunk
ContentOffset
ChunkLength
ChunkDataSetID
Fingerprint
124
<Chunk data set index>
file name:Chunk Data Set ID.cti
Chunk
Fingerprint
Offset
Length
Key
Value
123
1:1
<Chunk data set>
file name:Chunk Data Set ID.cts
Length
Chunk Data
122
<Chunk index management table>
file name:A part of Fingerprint
Chunk
Fingerprint
Chunk Data Set ID
Key
Value
125

Backup data
Meta
File A
Meta
File B
Meta
File C
Chunk header
Subjected to duplication determination
Subjected to duplication determination
Subjected to duplication determination
Primarily de-duplicated data

Fig. 7

| Chunk header item | | | |
|---|---|---|---|
| Magic number | Information indicating primarily de-duplicated compressed chunk | | |
| Status | 1: Not subjected to duplication determination | 2: New compressed chunk subjected to duplication determination | 3: Existing compressed chunk subjected to duplication determination |
| Fingerprint | Invalid value | Hash value calculated from compressed chunk | Hash value calculated from compressed chunk |
| Chunk data set ID | Invalid value | Chunk data set ID of storage destination of new compressed chunk | Chunk data set ID of storage destination of existing compressed chunk |
| Pre-compression Length | Length before compression | | |
| Post-compression Length | Length after compression | | |

301, 302, 303, 304, 305, 306

300

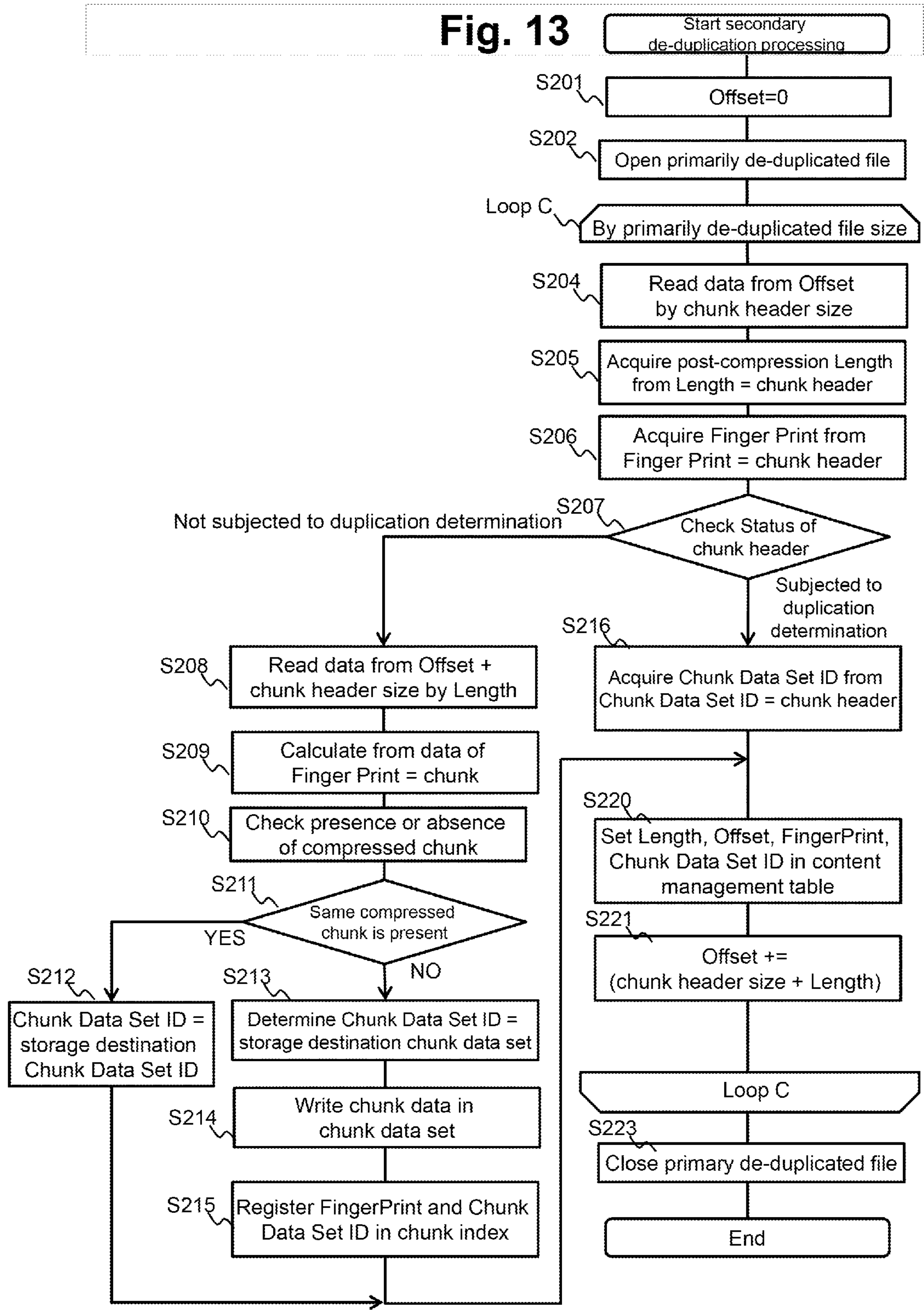

Fig. 13
Start secondary de-duplication processing
S201
Offset=0
S202
Open primarily de-duplicated file
Loop C
By primarily de-duplicated file size
S204
Read data from Offset by chunk header size
S205
Acquire post-compression Length from Length = chunk header
S206
Acquire Finger Print from Finger Print = chunk header
S207
Check Status of chunk header
Not subjected to duplication determination
Subjected to duplication determination
S208
Read data from Offset + chunk header size by Length
S209
Calculate from data of Finger Print = chunk
S210
Check presence or absence of compressed chunk
S211
Same compressed chunk is present
YES
NO
S212
Chunk Data Set ID = storage destination Chunk Data Set ID
S213
Determine Chunk Data Set ID = storage destination chunk data set
S214
Write chunk data in chunk data set
S215
Register FingerPrint and Chunk Data Set ID in chunk index
S216
Acquire Chunk Data Set ID from Chunk Data Set ID = chunk header
S220
Set Length, Offset, FingerPrint, Chunk Data Set ID in content management table
S221
Offset += (chunk header size + Length)
Loop C
S223
Close primary de-duplicated file
End

STORAGE APPARATUS AND DATA MANAGEMENT METHOD

TECHNICAL FIELD

The present invention relates to a storage apparatus for executing de-duplication processing for data and a data management method in the storage apparatus.

BACKGROUND ART

A storage apparatus retains a large-capacity storage area in order to store large data. A data amount increases year after year. Large data needs to be efficiently stored because of problems of the size and the costs of the storage apparatus. Therefore, in order to suppress the increase in the data amount stored in the storage area and increase data volume efficiency, de-duplication processing for data for detecting and eliminating duplication of data attracts attention.

The de-duplication processing is a technique for, when data (write data) to be written in a storage device anew is the same as data already stored in the storage device, managing only information such as a pointer to the already-stored data without writing the duplicate data in the storage device. Whether the write data is the same as the data already stored in the storage device is verified using, for example, hash values of the data.

Conventionally, a system for performing the de-duplication processing on the background after storing all data from a host apparatus in a disk (hereinafter referred to as post-process system as well) is adopted. However, in the post-process system, since all the data from the host apparatus needs to be written in the disk once, a large capacity storage area is necessary. Therefore, a technique for executing the de-duplication processing using not only the post-process system but also a system for performing the de-duplication processing before writing data in the disk (hereinafter referred to as inline system as well) is disclosed (e.g., PTL 1).

CITATION LIST

Patent Literature

[PTL 1]
US Patent Application Publication No. 2011/0289281 (Specification)

SUMMARY OF INVENTION

Technical Problem

PTL 1 simply discloses that the post-process system and the inline system are concurrently used in the de-duplication processing. However, in the post-process system, since all data is written in the disk once, overall processing performance depends on writing performance of the disk. In the inline system, since the de-duplication processing is performed when data is written in the disk, overall processing performance depends on performance of the de-duplication processing. Therefore, there is a problem in that the de-duplication processing for concurrently using both the systems taking into account the advantages of both the systems is necessary.

When both the systems are concurrently used, it is conceivable to adopt a method of comparing a compression ratio of data compressed in-line by the storage apparatus with a threshold and determining whether duplication determination of the inline system is carried out or duplication determination of the post-process system is carried out. However, if the threshold used for the determination is fixed, depending on a type of data or the like, for example, since processing is performed only for one of the duplication determination of the inline system or the duplication determination of the post-process system, the advantages of both the systems cannot be utilized.

Solution to Problem

A storage apparatus includes an interface, a storing apparatus related to a first storage area and a second storage area, and a control unit configured to determine, on the basis of a result of comparison of a compression ratio of data received via the interface with a threshold, whether first duplication determination for determining whether data same as the data compressed without being stored in the first storage area is stored in the second storage area is executed or second duplication determination for determining whether data same as the data compressed after being stored in the first storage area is stored in the second storage area is executed. The control unit is configured to change the threshold on the basis of a state of the storage apparatus.

A data management method is a management method for data in a storage apparatus including: executing comparison of a compression ratio of compressed data with a threshold; determining, on the basis of a result of the comparison, whether first duplication determination for determining whether data same as the data compressed without being stored in a first storage area is stored in a second storage area is executed or second duplication determination for determining whether data same as the data compressed after being stored in the first storage area is stored in the second storage area is executed; and changing the threshold on the basis of a state of the storage apparatus.

With such a configuration, it is possible to appropriately determine, on the basis of the comparison of the compression ratio of the data with the threshold, whether the first duplication determination is executed or the second duplication determination is executed. Since the threshold used for the comparison is changed on the basis of the state of the storage apparatus, it is possible to appropriately determine, according to the state of the storage apparatus, whether de-duplication is performed in primary de-duplication processing or the de-duplication is performed in secondary de-duplication processing.

Advantageous Effects of Invention

According to the present invention, it is possible to efficiently execute, on the basis of the state of the storage apparatus, the de-duplication processing taking into account advantages of two or more de-duplication mechanisms.

BRIEF DESCRIPTION OF DRAWINGS

FIG. 4 is a table for explaining metadata according to the first embodiment.

FIG. 5 is a conceptual diagram for explaining management information of chunks according to the first embodiment.

FIG. 7 is a table for explaining a header of the chunk according to the first embodiment.

FIG. 13 is a flowchart for explaining secondary de-duplication processing according to the first embodiment.

DESCRIPTION OF EMBODIMENTS

Embodiments of the present invention are explained in detail below with reference to the drawings.

(1) First Embodiment

(1-1) Overview of this Embodiment

Figure 1:
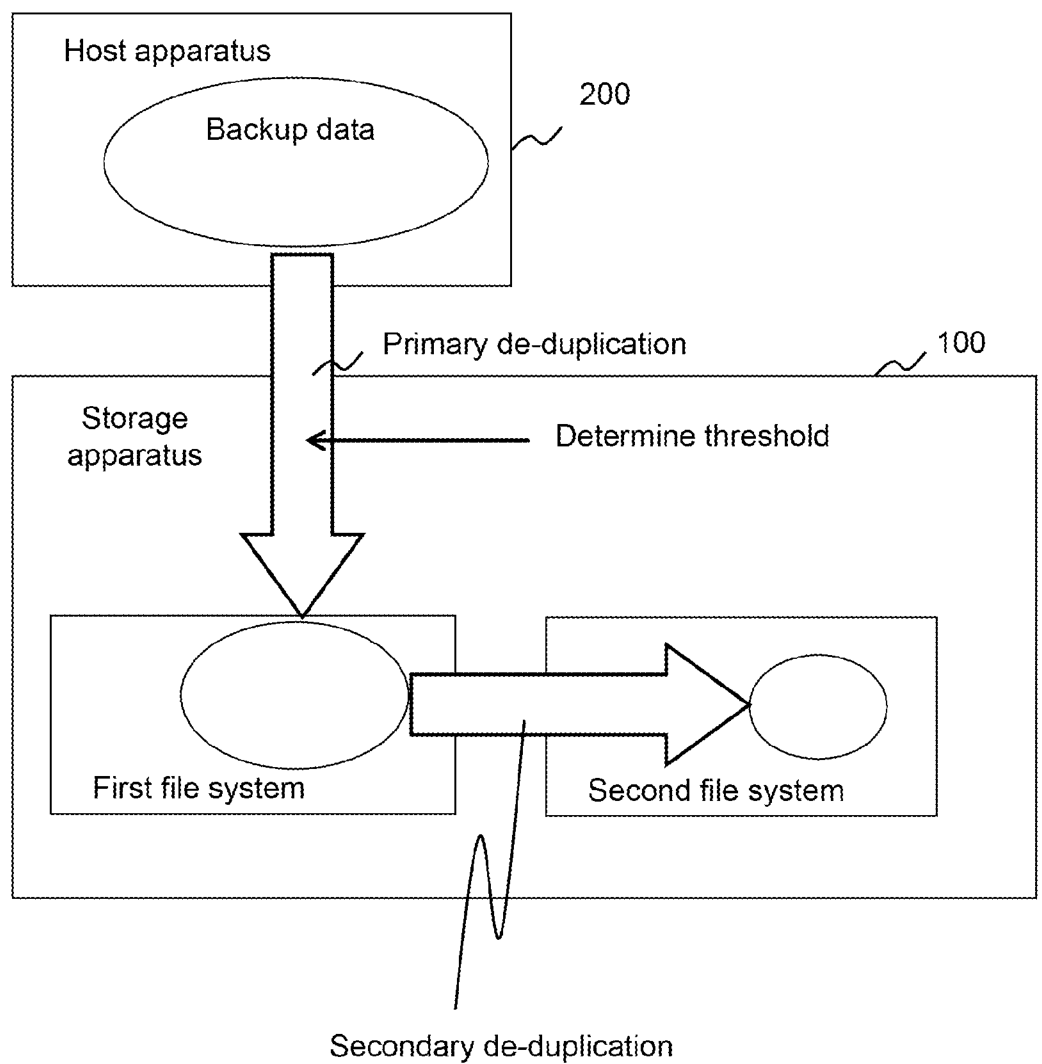
FIG. 1 is a conceptual diagram for explaining an overview of a computer system according to a first embodiment.

FIG. 1 is a conceptual diagram for explaining an overview of a computer system according to this embodiment. In the computer system according to this embodiment, a storage apparatus 100 stores backup data from a host apparatus 200 in a storage area. The host apparatus may be a server such as a backup server or other storage apparatuses. As storage areas for the backup data of the storage apparatus 100, a storage area (a first file system) in which the backup data (a part of the data is already de-duplicated) is temporarily stored and a storage area (a second file system) for the backup data after being subjected to de-duplication processing is stored are provided. The storage apparatus 100 in this embodiment separately retains the file system for the temporary storage area for the backup data (a part of the data is already de-duplicated) and the file system for the final storage area. However, the storage apparatus 100 is not limited to this and may retain two storage areas in the same file system.

When storing the backup data in the first file system, the storage apparatus 100 executes the de-duplication processing on a part of all of the data and does not execute the de-duplication processing on the other data (hereinafter explained as primary de-duplication processing). A system for performing the de-duplication processing before storing the backup data from the host apparatus 200 is referred to as inline system.

The storage apparatus 100 executes the de-duplication processing on the backup data stored in the first file system, which is data on which the de-duplication processing is not executed in the primary de-duplication processing, (hereinafter explained as secondary de-duplication processing) and stores the backup data in the second file system. A system for performing the de-duplication processing after storing the backup data once is referred to as post-process system.

In the post-process system, since all the data is written in a disk once, overall processing performance depends on writing performance of the disk. Further, in the post-process system, since all the data is written in the disk once, a large storage capacity is consumed for the data storage. In the inline system, since the de-duplication processing is performed when the data is written in the disk, overall processing performance depends on performance of the de-duplication processing. Therefore, it is necessary to execute the de-duplication processing taking into account advantages of both the systems.

In this embodiment, it is determined on the basis of a compression ratio of the data, whether de-duplication of the data is performed in the primary de-duplication processing or performed in the secondary de-duplication processing. In that case, if the threshold used for the determination is fixed, depending on a type of data or the like, for example, since processing is performed only for one of duplication determination of the inline system or duplication determination of the post-process system, the advantages of both the systems cannot be utilized. Therefore, in this embodiment, a threshold (a compression ratio) used for comparison with the compression ratio of the data in order to determine whether the de-duplication is performed in the primary de-duplication processing or performed in the secondary de-duplication processing is determined on the basis of a state of the storage apparatus 100. The state of the storage apparatus 100 is, for example, the remaining capacity of the first file system. As other examples of the state of the storage apparatus 100, there are, for example, a load by the secondary de-duplication processing and the number of chunks concerning the de-duplication by the primary de-duplication processing. Consequently, it is possible to appropriately determine, according to the state of the storage apparatus 100, whether the de-duplication is performed in the primary de-duplication processing or performed in the secondary de-duplication processing. In this embodiment, the compression ratio of the data is defined as explained below. That is, a compression ratio X % indicates the data can be compressed X % and indicates that the data after the compression is reduced to a data amount of (100−X) %. Note that, when the compression ratio is defined differently from this embodiment, for example, when the compression ratio indicates that the data after the compression with the compression ratio X % is reduced to a data amount of X %, concerning comparison and determination of the threshold and the compression ratio explained below in this embodiment, opposite determination is performed.

(1-2) Configuration of the Computer System

Figure 2:
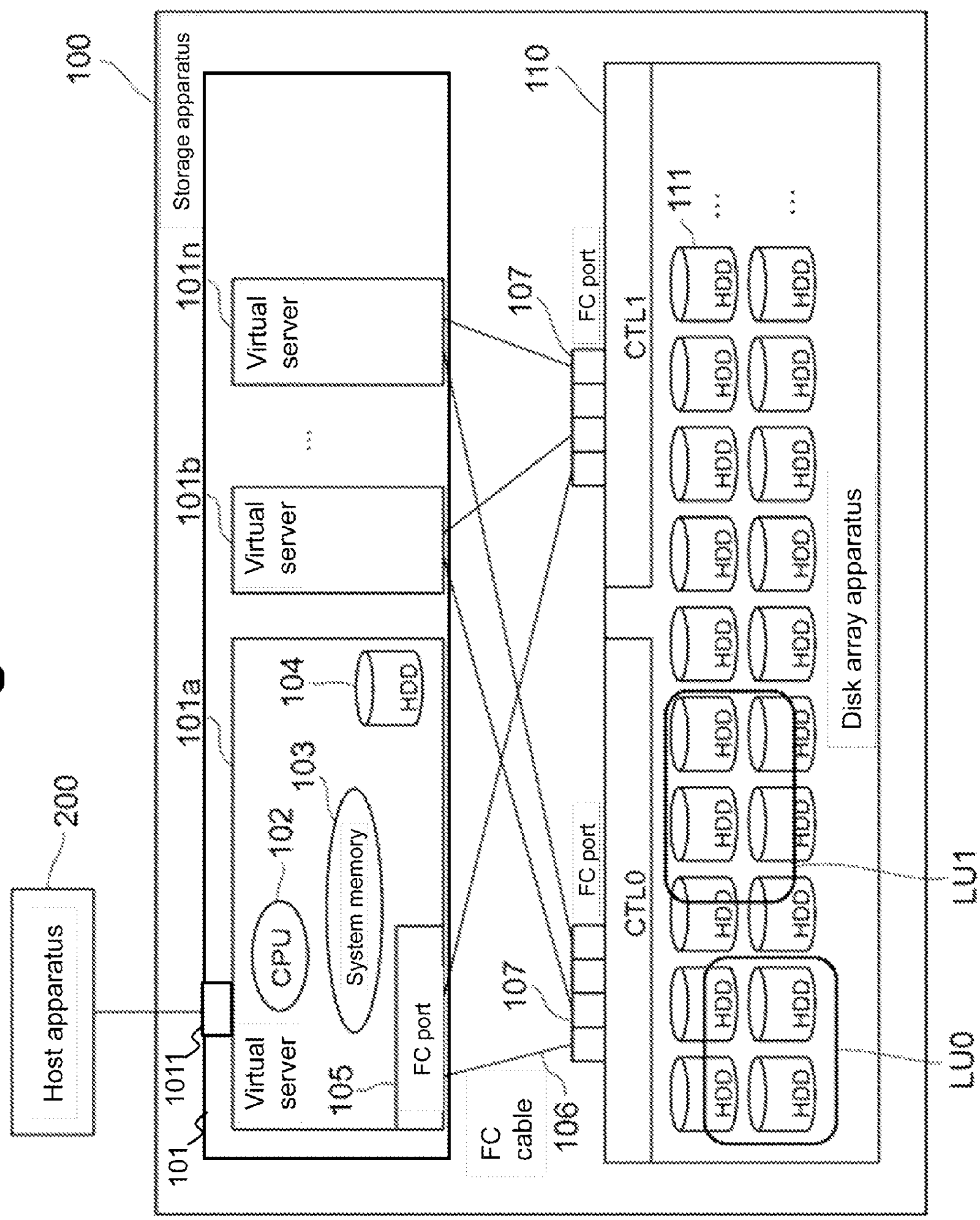
FIG. 2 is a block diagram showing a hardware configuration of the computer system according to the first embodiment.

FIG. 2 is a block diagram showing a hardware configuration of the computer system according to this embodiment.

As shown in FIG. 2, the computer system includes the storage apparatus 100 and the host apparatus 200. The host apparatus 200 is coupled to the storage apparatus 100 via a network such as a storage area network (SAN) or a network attached storage (NAS). Although not shown in the figure, the computer system may include a management terminal configured to control the storage apparatus 100.

The storage apparatus 100 interprets a command transmitted from the host apparatus 200 and executes read/write in a storage area of a disk array apparatus 110. The storage apparatus 100 is configured by a server 101 configured to provide a plurality of virtual servers 101*a*, 101*b*, 101*c*, . . . , and 101*n* (hereinafter generally referred to as virtual server 101 as well in some case), a fiber channel cable (described as FC cable in the FIG. 106, and the disk array apparatus 110. The server includes an interface 1011 such as a port between the server and the host. The interface 1011 may be either a wired port or a wireless port. The storage apparatus receives data from the host apparatus via the interface. The virtual server 101 and the disk array apparatus 110 are coupled via the fiber channel cable 106 coupled to fiber channel ports 105 and 107. In this embodiment, the virtual server is used. However, a physical server may be used.

The virtual server 101 is a computer environment virtually reproduced in the storage apparatus 100. The virtual server 101 includes a CPU 102, a system memory 103, a hard disk drive (HDD) 104, and the fiber channel port (described as FC port in the FIG. 105.

The CPU 102 functions as a control unit (a control device) and controls the operation of the entire storage apparatus 100 according to various programs, arithmetic operation parameters, and the like stored in the system memory 103. In the system memory 103, a program for managing the file systems, a program for executing the primary de-duplication processing, a program for executing the secondary de-duplication processing, and a program for determining the threshold are mainly stored.

The HDD 111 is configured by a plurality of storage media. For example, the HDD 111 may be configured by a plurality hard disk drives including expensive hard disk drives such as small computer system interface (SCSI) disks or inexpensive hard disk drives such as serial AT attachment (SATA) disks. In this embodiment, the HDD is used as a storage medium. However, other storage media such as a solid state disk (SSD) may be used.

One redundant array of inexpensive disks (RAID) group is configured by a plurality of HDDs 111. One or a plurality of logical units (LUs) are configured on a physical storage area provided by one or a plurality of RAID groups. Data from the host apparatus 200 is stored in this logical unit (LU) in a unit of a block having predetermined size. In this embodiment, the program for managing the file systems mounts an LU 0 configured by the plurality of HDDs 111 of the disk array apparatus 110 on the first file system and mounts an LU 1 on the second file system and uses the file systems.

The host apparatus 200 is a computer apparatus including an arithmetic unit such as a central processing unit (CPU) and information processing resources such as storage area including a memory and a disk, and, when necessary, information input and output apparatuses such as a keyboard, a mouse, a monitor display, a speaker, and a communication I/F card. The host apparatus 200 is configured by, for example, a personal computer, a work station, a mainframe, or the like. The host apparatus may be a server such as a backup server.

(1-3) Software Configuration of the Storage Apparatus

Figure 3:
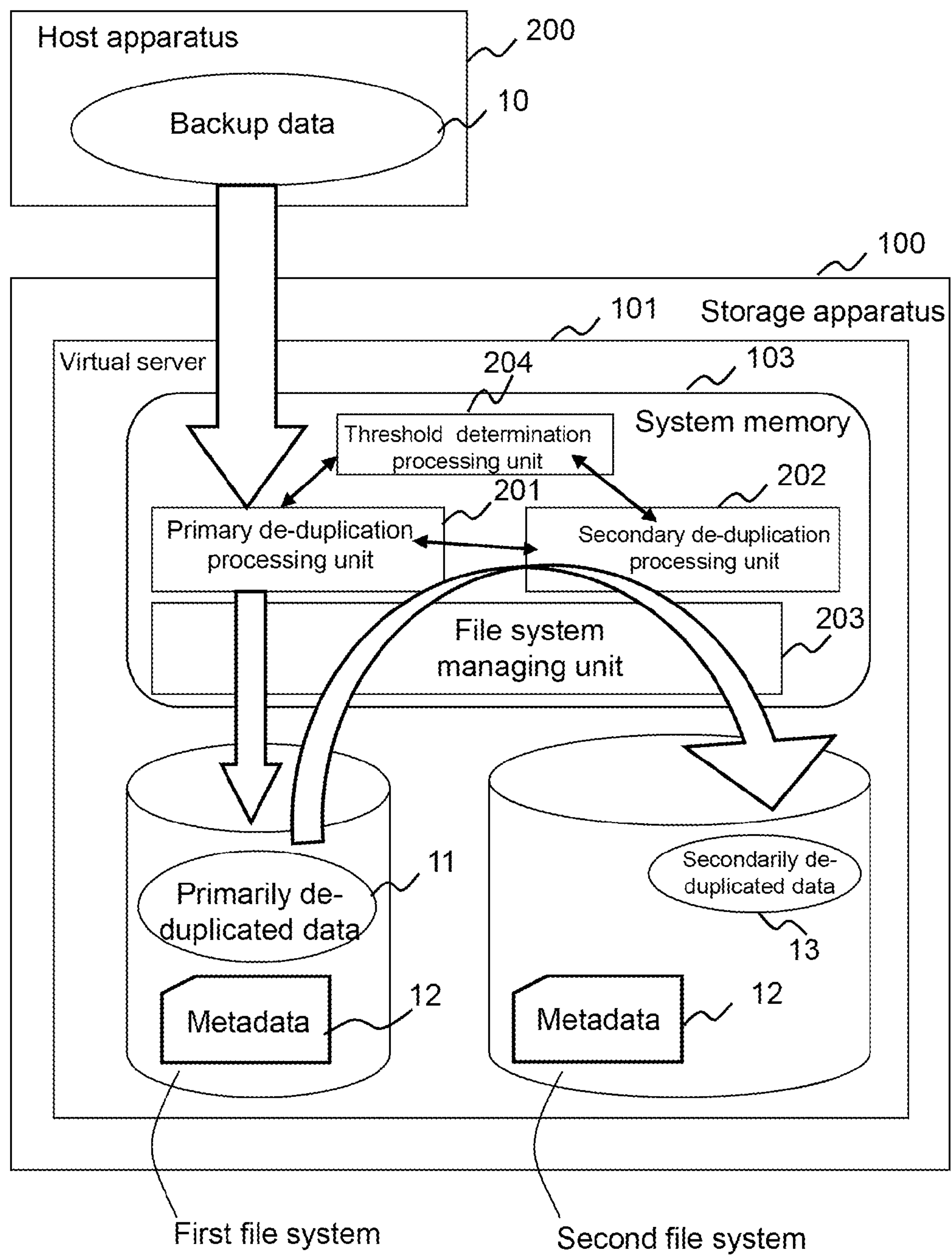
FIG. 3 is a block diagram showing a software configuration of a storage apparatus according to the first embodiment.

FIG. 3 is a block diagram showing a software configuration of the storage apparatus according to this embodiment.

As shown in FIG. 3, in the system memory 103 of the storage apparatus 100, programs such as a primary de-duplication processing unit 201, a secondary de-duplication processing unit 202, a file system managing unit 203, and a threshold determination processing unit 204 are stored. ("XXX unit" may read "XXX program" as well.) Note that these programs are executed by the CPU 102. Therefore, in the following explanation, when processing is explained using these programs as subjects, actually, it is meant that the processing is realized by executing the programs with the CPU 102.

The primary de-duplication processing unit 201 primarily de-duplicates backup data 10 from the host apparatus 200 and stores the backup data 10 in the first file system. The secondary de-duplication processing unit 202 secondarily de-duplicates primarily de-duplicated data 11 stored in the first file system and stores the primarily de-duplicated data 11 in the second file system. The threshold determination processing unit 204 executes, on the basis of a state of the storage apparatus 100, threshold determination processing for determining a threshold.

In this embodiment, different kinds of de-duplication processing are executed in primary de-duplication processing executed by the primary de-duplication processing unit 201 and secondary de-duplication processing executed by the secondary de-duplication processing unit 202. In the primary de-duplication processing, the primary de-duplication processing unit 201 performs division processing and compression processing for data, which are kinds of processing with a small load, in the de-duplication processing. The primary de-duplication processing unit 201 determines, on the basis of a compression ratio of the data after the compression processing, whether calculation of a hash value of the data and the de-duplication processing are executed in the primary de-duplication processing or in the secondary de-duplication processing. In the secondary de-duplication processing, the secondary de-duplication processing unit 202 executes the de-duplication processing on the data for which the calculation of the hash value is not performed in the primary de-duplication processing.

As explained above, when all the backup data are de-duplicated in the primary de-duplication processing, which is the inline system, the de-duplication processing takes time and processing performance of the entire storage apparatus 100 depends on performance of the de-duplication processing. When all the backup data is de-duplicated in the post-process system, i.e., when the backup data is subjected to the de-duplication processing in the secondary de-duplication processing after being stored in the first file system once, the entire processing performance depends on writing performance of the disk. Further, in the post-process system, since all the data is written in the disk once, a large storage capacity is consumed for data storage. If the primary de-duplication processing and the secondary de-duplication processing are simply concurrently used, the similar de-duplication processing is executed in both the kinds of processing and useless de-duplication processing is caused.

Therefore, in this embodiment, in the primary de-duplication processing, the division processing and the compression processing for the data, which are kinds of processing with a small load, of the de-duplication processing are performed in the primary de-duplication processing and duplication determination processing is further executed on the divided data with a low compression ratio (data that consumes a large capacity of a temporary storage area). The data divided in the primary de-duplication processing is referred to as chunks and explained below. The division processing for the data is explained in detail below. The duplication determination processing in the de-duplication processing takes substantially equal time irrespective of a compression ratio of the divided data (chunks). Therefore, in the primary de-duplication processing, by executing the duplication determination processing on the chunks with a low compression ratio, it is possible to increase the speed of write processing for the data while reducing a load of the de-duplication processing. Further, by subjecting the chunks with the low compression ratio to the de-duplication processing in the inline system, it is possible to reduce a consumed amount of the storage area for temporary storage of the data.

On the other hand, in the secondary de-duplication processing, the duplication determination processing is executed on the chunks other than the chunks on which the de-duplication processing is already executed in the primary de-duplication processing, whereby the similar de-duplication processing is prevented from being executed in the primary de-duplication processing and the secondary de-duplication processing. Specifically, concerning the chunks on which the duplication determination processing is executed in the primary de-duplication processing, a flag indicating that the duplication determination processing is already executed is configured in data header of the chunks. In the secondary de-duplication processing, with reference to the configured flag, the duplication determination processing is executed on the chunks on which the duplication determination processing is not executed in the primary de-duplication processing.

A tendency concerning whether the compression ratio of the chunks is high or low changes according to a type of a received file or the like. For example, a compression ratio of chunks obtained by dividing a file having a certain characteristic tends to be high (low). Therefore, if a threshold (a compression ratio) used in determining whether the de-duplication processing is carried out in the primary de-duplication processing or the secondary de-duplication processing is fixed, for example, it is likely that a load of one de-duplication processing increases. The advantages of both the kinds of processing cannot be effectively used. Therefore, in this embodiment, a threshold (a compression ratio) used for comparison with a compression ratio of data in order to determine whether the de-duplication is performed in the primary de-duplication processing or in the secondary de-duplication processing is determined on the basis of a state of the storage apparatus 100. The state of the storage apparatus 100 is, for example, a remaining capacity of the first file system. As other examples of the state of the storage apparatus 100, there are a load by the secondary de-duplication processing, the number of chunks concerning the de-duplication by the primary de-duplication processing, and the like. Consequently, it is possible to appropriately determine, according to the state of the storage apparatus 100, whether the de-duplication is performed in the primary de-duplication processing or in the secondary de-duplication processing.

FIG. 4 is a table for explaining metadata according to this embodiment.

Metadata 12 stored in the first file system and the second file system is explained with reference to FIG. 4. The metadata 12 is data indicating management information of primarily de-duplicated data stored in the first file system or secondarily de-duplicated data stored in the second file system.

As shown in FIG. 4, various tables are included in the metadata 12. Specifically, tables such as a stub file (Stub file) 121, a chunk data set (Chunk Data Set) 122, a chunk data set index (Chunk Data Set Index) 123, a content management table 124, and a chunk index 125 are included in the metadata 12. The stub file (Stub file) 121 is stored in the first file system. The table such as the chunk data set (Chunk Data Set) 122, the chunk data set index (Chunk Data Set Index) 123, the content management table 124, and the chunk index 125 are stored in the second file system.

The stub file 121 is a table for associating backup data and a content ID. The backup data is configured by a plurality of file data. The file data is referred to as logically collected contents, which are a unit of storage in a storage area. As the contents, besides a normal file, for example, a file obtained by aggregating normal files such as an archive file, a backup file, or a virtual volume file can be illustrated. Each of the contents is divided into a plurality of chunks. Each of the contents is identified by a content ID. The content ID is stored in the stub file 121. When the storage apparatus 100 performs read/write of data stored in the disk array apparatus 110, first, the content ID stored in the sub file 121 is invoked.

The chunk data set 122 is user data configured by a plurality of chunks and is backup data stored in the storage apparatus 100. In the chunk data set index 123, information concerning each of the chunks included in the chunk data set 122 is stored. Specifically, in the chunk data set index 123, length information and chunk data of each of the chunks are stored in association with each other.

The content management table 124 is a table for managing chunk information in the contents. The contents are file data identified by the content ID. The chunk index 125 is information indicating in which chunk data set 122 the chunks are present. In the chunk index 125, a finger print of a chunk for identifying each of the chunks and a chunk data set ID for identifying the chunk data set 122 in which the chunk is present are associated with each other.

FIG. 5 is a conceptual diagram for explaining management information of the chunks according to this embodiment.

As shown in FIG. 5, in the stub file (described as Stub file in the FIG. 121, a content ID (described as Content ID in the figure) for identifying an original data file is stored. One content file corresponds to one stub file 121. Each of content files is managed by the content management table (described as Content Mng Tbl in the FIG. 124.

Each of the content files managed by the content management table 124 is identified by a content ID (described as Content ID in the figure). In the content file, offset of each of the chunks (Content Offset), chunk length (Chunk Length), identification information of a container in which the chunk is present (Chunk Data Set ID), and a hash value of each of the chunks (Fingerprint) are stored.

In the chunk data set index (described as Chunk Data Set Index in the FIG. 123, as management information of chunks, the hash value (Fingerprint) of the chunks and offset and data length of the chunks stored in the chunk data set (described as Chunk Data Set in the FIG. 122 are stored in association with each other. Each of chunk data sets 122 is identified by a chunk data set ID (described as Chunk Data Set ID in the figure). In the chunk data set index 123, the management information of the chunks is collected and managed for each of chunk data sets.

In the chunk data set 122, a predetermined number of chunks are managed as one container. Each of containers is identified by a chunk data set ID. A plurality of chunk data affixed with chunk length are included in each of the containers. The chunk data set ID for identifying the containers of the chunk data set 122 and the chunk data set ID of the chunk data set index 123 are associated with each other.

In the chunk index 125, the hash value (Fingerprint) of each of the chunks and identification information (Chunk Data Set ID) of the container in which the chunk is present are stored in association with each other. The chunk index 125 is a table for determining, when the de-duplication processing is executed, on the basis of a hash value calculated from each of the chunks, in which container the chunk is stored.

Figure 6:
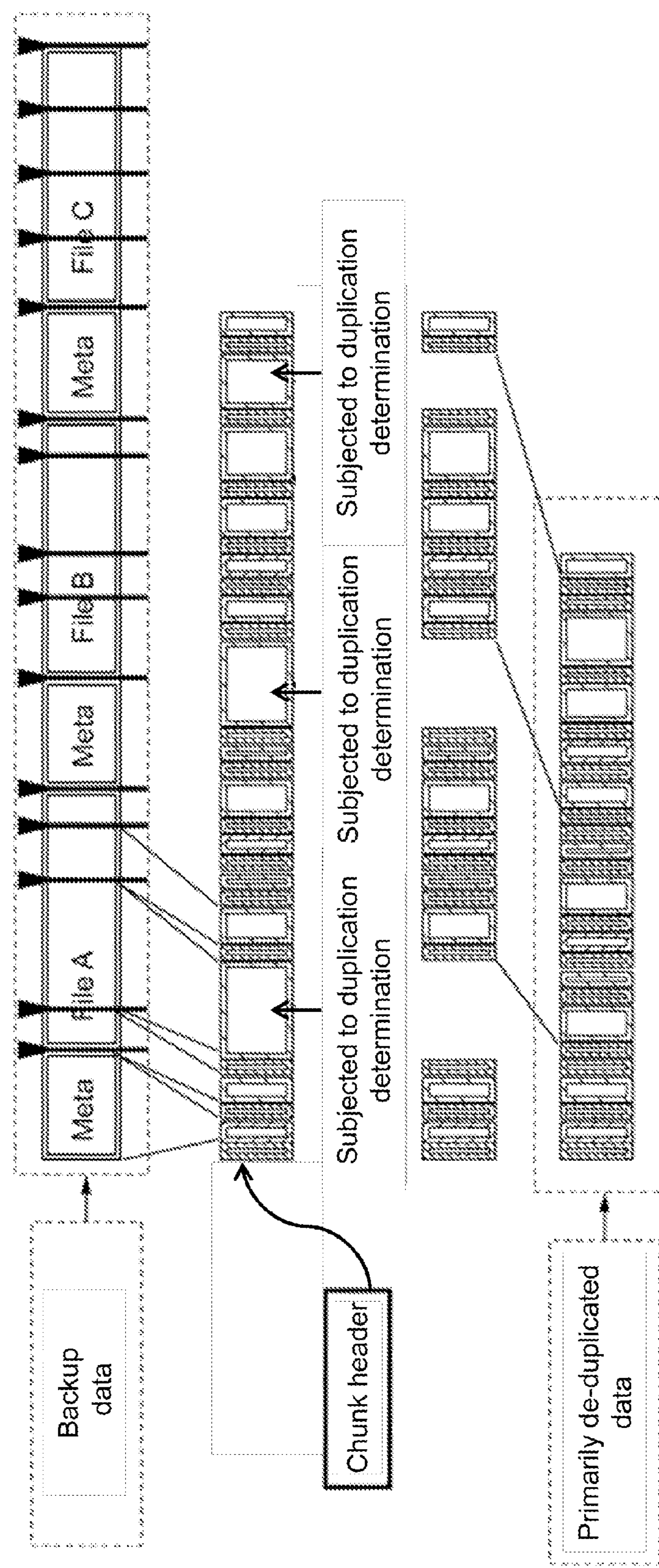
FIG. 6 is a conceptual diagram showing primarily de-duplicated data according to the first embodiment.

FIG. 6 is a conceptual diagram showing primarily de-duplicated data according to this embodiment.

The primary de-duplication processing unit 201 slices content into a plurality of chunks and compresses each of the chunks (the chunk compressed by the primary de-duplication processing unit 201 is sometimes referred to as compressed chunk below).

As shown in FIG. 6, first, the primary de-duplication processing unit 201 divides content into a header section (described as Meta in the figure) and a body section (described as File X in the figure). The primary de-duplication processing unit 201 further divides the body section in fixed length or variable length. When the content is divided in the fixed length, for example, chunks having fixed length such as 4 kilobytes (KB) or 1 megabyte (MB) are sequentially sliced. When the content is divided in the variable length, a boundary of the slicing of the chunks is determined on the basis of a local condition of the content to slice the chunks. For example, files in which the structure of content hardly changes such as a vmdk file, a vdi file, a vhd file, a zip file, and a gzip file are divided in fixed length and files other than these files are divided in variable length.

The primary de-duplication processing unit 201 compresses the divided chunks and applies the de-duplication processing to the compressed chunks with a low compression ratio (the chunks having a compression ratio lower than a threshold). The primary de-duplication processing unit 201 calculates a hash value of the compressed chunks, which are the target of the de-duplication processing, and determines, on the basis of the hash value, whether the same compressed chunks are already stored in the HDD 104. As a result of performing the de-duplication processing, the primary de-duplication processing unit 201 excludes the compressed chunks on which the de-duplication processing is already executed and creates primarily de-duplicated data to be stored in the first file system. The primary de-duplication processing unit 201 affixes a chunk header indicating data information after the compression to each of the compressed chunks and manages the chunk. In the primary de-duplication processing (the inline system), calculation of a hash value and the de-duplication processing for the chunks having a compression ratio higher than the threshold are not executed.

The chunk header of the compressed chunk is explained. FIG. 7 is a table for explaining the chunk header of the compressed chunk according to this embodiment. "Chunk header" may read "compression header". As shown in FIG. 7, the chunk header includes a magic number 301, a status 302, a fingerprint 303, a chunk data set ID 1304, pre-compression length 305, and post-compression length 306.

In the magic number 301, information indicating that the compressed chunk is a compressed chunk subjected to the primary de-duplication processing is stored. In the status 302, information indicating whether the duplication determination processing is executed on the compressed chunk is stored. For example, when a status 1 is stored in the status 302, this indicates that the duplication determination is not carried out yet. When a status 2 is stored in the status 302, this indicates that the compressed chunk is a new compressed chunk subjected to the duplication determination and not stored in the HDD 104 yet. When a status 3 is stored in the status 302, this indicates that the compressed chunk is an existing compressed chunk subjected to the duplication determination and already stored in the HDD 104.

In the fingerprint 303, a hash value calculated from the compressed chunk is stored. Concerning the compressed chunk not subjected to the duplication determination processing in the primary de-duplication processing, an invalid value is stored in the finger print 303. That is, concerning the compressed chunk in the status 1, since the duplication determination processing is not executed yet, an invalid value is stored in the fingerprint 303.

In the chunk data set ID 304, a chunk data set ID of a compressed chunk storage destination is stored. The chunk data set ID 304 is information for identifying a container (Chunk Data Set 122) in which the compressed chunk is stored. Concerning a chunk on which the primary de-duplication processing is not executed, an invalid data is stored in the chunk data set ID 304. That is, an invalid value is stored in the chunk data set ID 304 in the status 1.

In the pre-compression length 305, chunk length before the compression is stored. In the post-compression length 306, chunk length after the compression is stored.

The secondary de-duplication processing unit 202 determines whether the duplication determination processing for each of the compressed chunks is executed referring to the chunk header of the compressed chunk included in primary de-duplication data created by the primary de-duplication processing unit 201. Specifically, the secondary de-duplication processing unit 202 determines whether the duplication determination processing is performed referring to the status of the chunk header of the compressed chunk.

For example, when the status 302 of the chunk header of the compressed chunk is the status 1, since the duplication determination processing is not executed in the primary de-duplication processing, the secondary de-duplication processing unit 202 executes the duplication determination processing in the secondary de-duplication processing. When the status 302 of the chunk header of the compressed chunk is the status 2, the secondary de-duplication processing unit 202 executes the duplication determination processing in the primary duplication determination processing and a new compressed chunk is stored in the chunk data set in the primary duplication determination processing. Therefore, the secondary de-duplication processing unit 202 acquires a storage destination of an existing new chunk without executing the duplication determination processing. When the status 302 of the chunk header of the chunk is the status 3, the duplication determination processing is executed in the primary duplication determination processing and the compressed chunk is a chunk already stored in the chunk data set 122. Therefore, the secondary de-duplication processing unit 202 acquires the storage destination of the existing compressed chunk without executing the duplication determination processing. Since the state of each of the chunks can be appropriately managed in this way, it is possible to execute processing suitable for each of the chunks.

(1-4) De-Duplication Processing

The de-duplication processing is explained more in detail below with reference to a flowchart.

Figure 8:
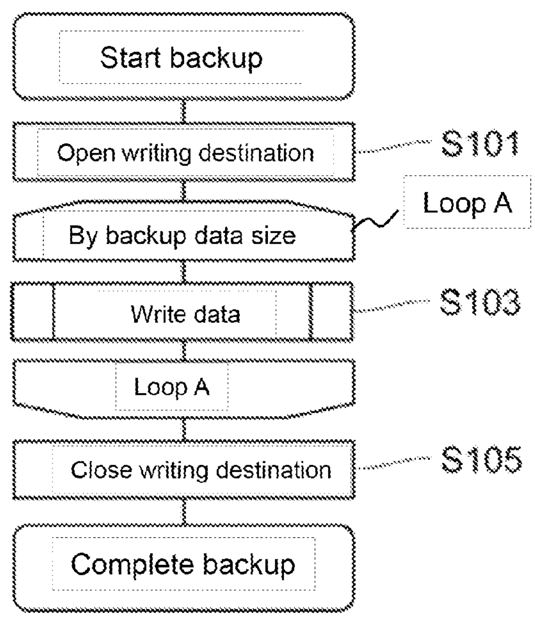
FIG. 8 is a flowchart for explaining backup processing according to the first embodiment.

FIG. 8 is a flowchart for explaining backup processing according to this embodiment.

In the de-duplication processing according to this embodiment, the storage apparatus 100 starts backup of data in response to a request from the host apparatus 200. In the backup processing for data in the storage apparatus 100, as shown in FIG. 8, first, the storage apparatus 100 opens a writing destination of the data (S101) and repeats, by the size of the backup data, writing processing (S103) for the data in a loop A. After the writing processing for the data ends, the storage apparatus 100 closes the writing destination (S105) and ends the backup processing.

Figure 9:
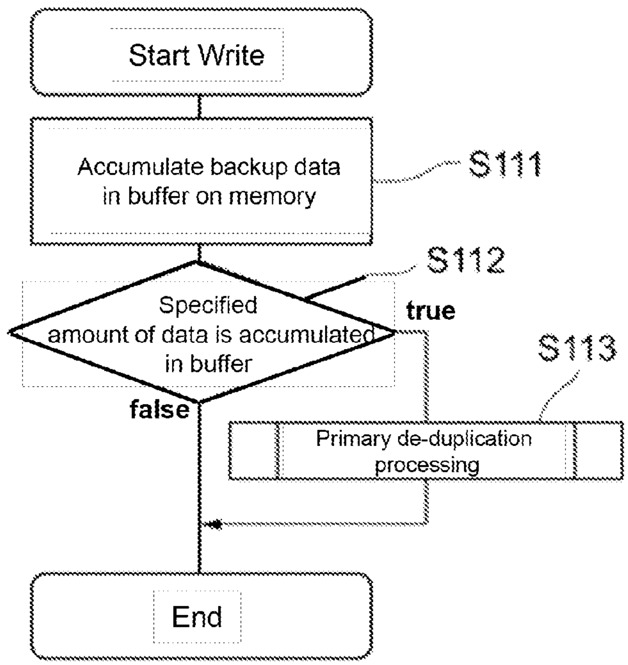
FIG. 9 is a flowchart for explaining write processing for data according to the first embodiment.

FIG. 9 is a flowchart for explaining the writing processing for the data according to this embodiment. In the writing processing for the data in step S103 explained above, as shown in FIG. 9, the storage apparatus 100 accumulates the backup data from the host apparatus 200 in a buffer on the memory (S111).

The storage apparatus 100 determines whether a specified amount of data is accumulated in the buffer (S112). When it is determined in step S112 that the specified amount of data is accumulated in the buffer, the storage apparatus 100 causes the primary de-duplication processing unit 201 to execute the primary de-duplication processing. On the other hand, when it is determined in step 112, that the specified amount of data is not accumulated in the buffer, the storage apparatus 100 further receives the backup data (S103).

(1-4-1) Details of the Primary De-Duplication Processing

Figure 10:
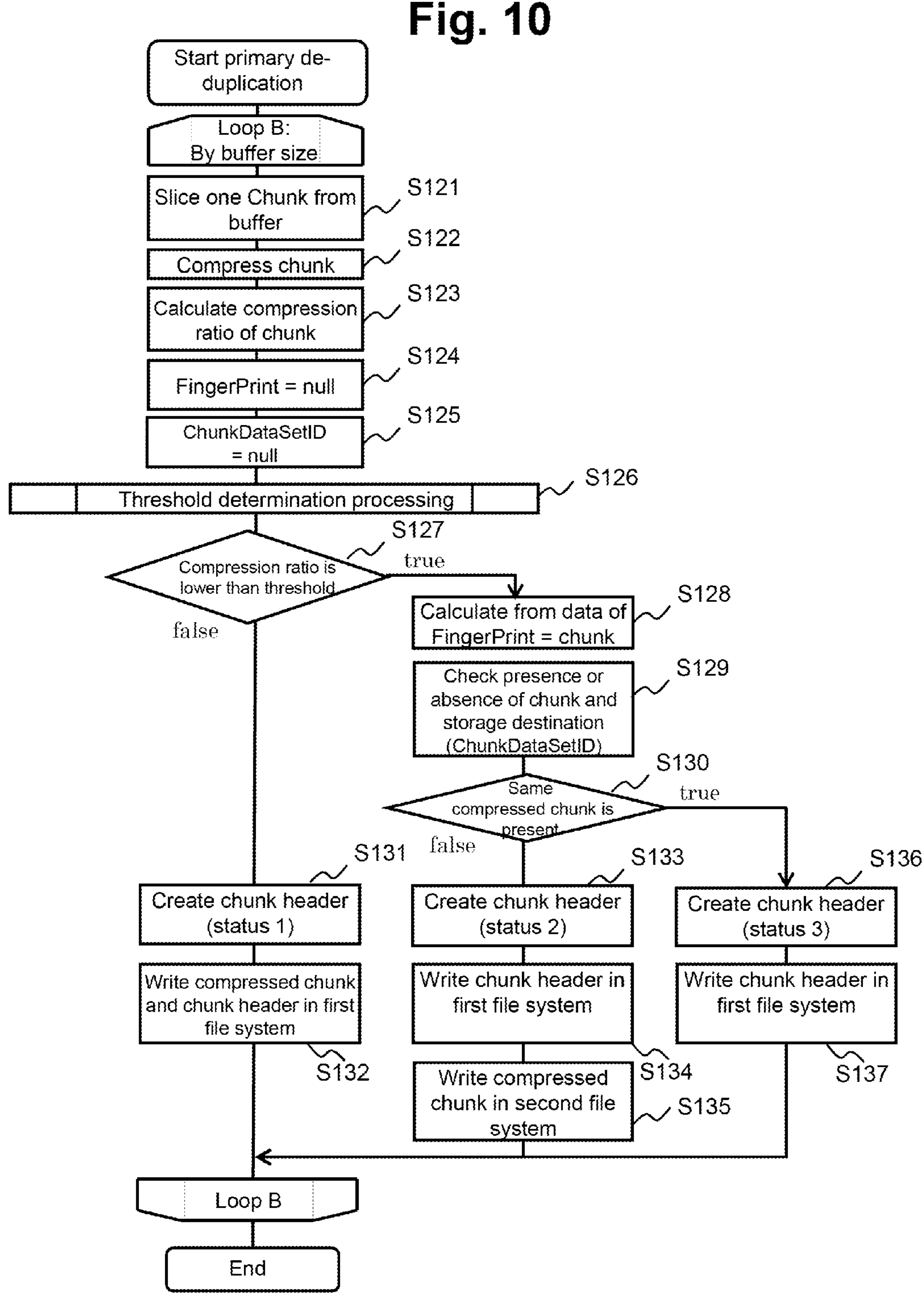
FIG. 10 is a flowchart for explaining primary de-duplication processing according to the first embodiment.

FIG. 10 is a flowchart for explaining the primary de-duplication processing according to this embodiment.

As shown in FIG. 10, the primary de-duplication processing unit 201 repeats, concerning the data accumulated in the buffer, processing (S121 to S137) of a loop B for the buffer size.

The primary de-duplication processing unit 201 slices one chunk from the buffer in fixed length or variable length (S121). In step S122, the primary de-duplication processing unit 201 compresses the sliced chunk (S122) and calculates a compression ratio of the chunk (S123).

The primary de-duplication processing unit 201 substitutes a null value in a variable FingerPrint of a chunk header 300 (S124) and substitutes a null value in a variable ChunkDataSetID of the chunk header 300 (S125). Subsequently, the primary de-duplication processing unit 201 causes the threshold determination processing unit 204 to execute threshold determination processing (see FIG. 11) for determining a threshold explained later (S126).

Subsequently, the primary de-duplication processing unit 201 determines whether the compression ratio of the chunk calculated in step S123 is lower than the threshold determined in step S126 (S127). In step S127, the compression ratio of the chunk is lower than the determined threshold, for example, when the chunk length hardly changes before and after the compression.

When it is determined in step S127 that the compression ratio of the chunk is lower than the threshold (S127: true), the primary de-duplication processing unit 201 executes processing in step S128 and subsequent steps. On the other hand, when it is determined in step S127 that the compression ratio of the chunk is higher than the threshold (S127: false), the primary de-duplication processing unit 201 executes processing in step S131 and subsequent steps.

In step S128, the primary de-duplication processing unit 201 calculates a hash value from the chunk compressed by the de-duplication processing unit (hereinafter sometimes referred to as compressed chunk) and substitutes a calculation result in the variable FingerPrint of the chunk header 300 (S128).

The primary de-duplication processing unit 201 checks, using the calculated hash value, whether the compressed chunk is stored in the chunk data set. When the compressed chunk is stored in the chunk data set, the primary de-duplication processing unit 201 checks the chunk data set ID (ChankDataSetID) of the chunk data set (S129). The primary de-duplication processing unit 201 inquires, using the compressed chunk and the calculated hash value, the secondary de-duplication processing unit 202 whether the compressed chunk is stored in the chunk data set. The primary de-duplication processing unit 201 can check, by receiving an inquiry result, whether the compressed chunk is stored in the chunk data set and, when the compressed chunk is stored in the chunk data set, check the chunk data set ID.

The primary de-duplication processing unit 201 determines whether a compressed chunk same as the compressed chunk, which is a target of the duplication determination processing, is stored in the chunk data set (S130). When it is determined in step S130 that the same compressed chunk is stored (S130: true), the primary de-duplication processing unit 201 executes processing in step S136 and subsequent steps. On the other hand, when it is determined in step S130 that the same compressed chunk is not stored (S130: false), the primary de-duplication processing unit 201 executes processing in step S133 and subsequent steps.

When it is determined in step S127 that the compression ratio is higher than the threshold (S127: false), the primary de-duplication processing unit 201 creates a chunk header of the status 1 without executing the duplication determination processing (S131). As explained above, the chunk header of the status 1 is a chunk header affixed to the compressed chunk not subjected to the duplication determination. As shown in FIG. 7, when the chunk header is the status 1, the compressed chunk and the chunk header are written in the first file system (S132). Since the duplication determination processing is not carried out, the null values remain in the fingerprint 303 and the chunk data set ID 304 of the chunk header.

When it is determined in step S127 that the compression ratio is lower than the threshold and, as a result of the duplication determination processing being executed, when it is determined that the same compressed chunk is absent in the chunk data set 122 (S130: false), the primary de-duplication processing unit 201 creates a chunk header of the status 2 (S133). As explained above, the chunk header of the status 2 is a chunk header subjected to the duplication determination and affixed to the compressed chunk when the same compressed chunk is absent in the chunk data set 122. As shown in FIG. 7, when the chunk header is the status 2, the primary de-duplication processing unit 201 writes the chunk header in the first file system (S134). Further, the secondary de-duplication processing unit 202 writes the compressed chunk in the second file system (S135). Specifically, the secondary de-duplication processing unit 202 determines the chunk data set (ChunkDataSet) 122 at a storage destination in which the compressed chunk is stored. The secondary de-duplication processing unit 202 writes the chunk header and the data of the compressed chunk in the chunk data set (ChunkDataSet) 122. In the fingerprint 303 of the chunk header, a hash value calculated from the compressed chunk is stored. In the chunk data set ID 304, a chunk data set ID in which a new compressed chunk is written is stored. When the chunk header is the status 2, only the chunk header is written in the first file system. The data itself of the compressed chunk is not written in the first file system. Therefore, it is possible to reduce a storage capacity of the first file system.

When it is determined in step S127 that the compression ratio is lower than the threshold and, as a result of the duplication determination processing being executed, when it is determined that the same compressed chunk is present in the chunk data set 122 (S130: true), the primary de-duplication processing unit 201 creates a chunk header of the status 3 (S136). As explained above, the chunk header of the status 3 is a chunk header subjected to the duplication determination and affixed to the chunk when the same compressed chunk is present in the chunk data set 122. As shown in FIG. 7, when the chunk header is the status 3, only the chunk header is written in the first file system (S137). That is, the data itself of the compressed chunk is not written in both of the first file system and the second file system. Therefore, it is possible to reduce storage capacities of the first fie system and the second file system.

(1-4-1-1) Details of the Threshold Determination Processing

Figure 11:
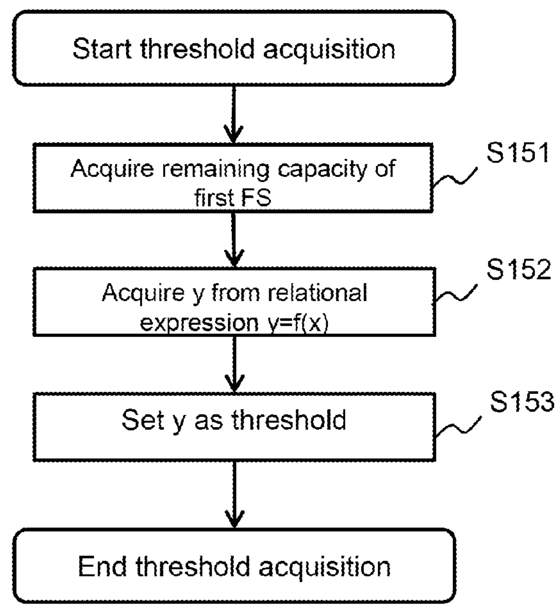
FIG. 11 is a flowchart for explaining threshold determination processing according to the first embodiment.

FIG. 11 is a flowchart for explaining the threshold determination processing according to this embodiment. Details of the threshold determination processing by the threshold determination processing unit 204 are explained with reference to FIG. 11. Note that, in this embodiment, the threshold determination processing unit 204 is invoked and executed during the primary de-duplication processing (S126 in FIG. 10). However, the threshold determination processing unit 204 is not limited to this and may be executed at timing determined in advance or may be executed according to an input of an administrator.

Figure 12:
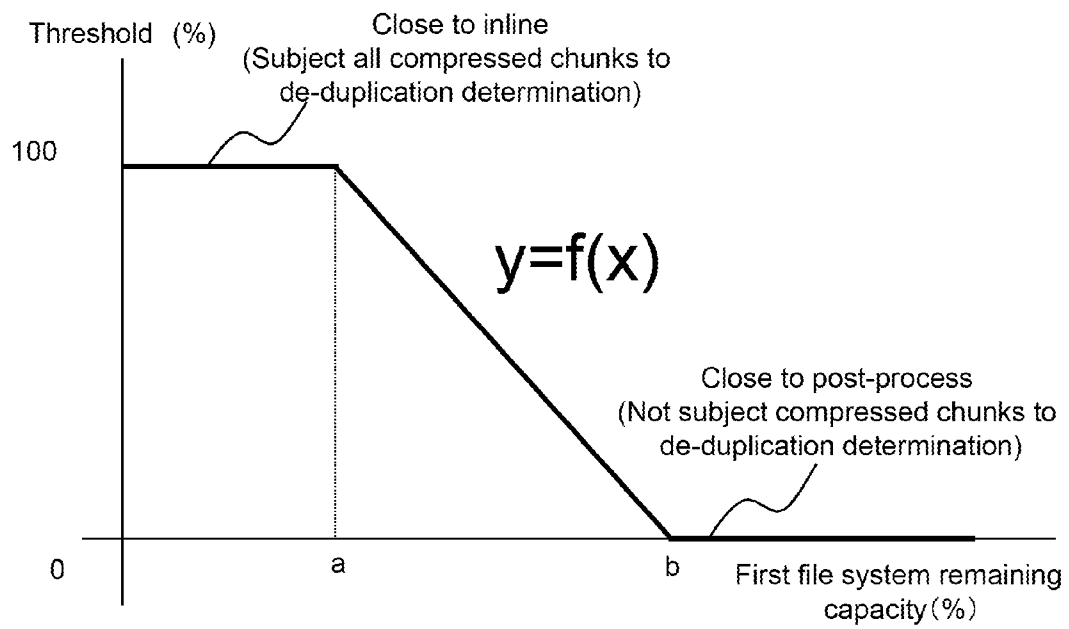
FIG. 12 is a diagram for explaining a threshold according to the first embodiment.

The threshold determination processing unit 204 acquires a remaining capacity x (I) of the first file system (S151). As x, the size of the remaining capacity may be directly used or a used capacity may be used rather than the remaining capacity. Subsequently, the threshold determination processing unit 204 acquires a threshold y from a relational expression y=f(x) (S152), sets the threshold y as a threshold used in step S127 (S153), and ends the threshold determination processing. In the relational expression y=f(x), for example, as shown in FIG. 12, the threshold y is 100 when the remaining capacity x (%) of the first file system is between 0 and a value a. When the threshold y is 100, processing close to the inline system is executed, i.e., the de-duplication processing is executed on all the compressed chunks in the primary de-duplication processing. The relational expression y=f(x) has a correspondence relation that, when the remaining capacity x of the first file system is between the value a and a value b, for example, when the remaining capacity x of the first file system increases, the threshold y decreases (e.g., decreases in a linear function manner). In the relational expression y=f(x), when the remaining capacity x of the first file system is equal to or larger than the value b, the threshold y is 0. When the threshold y is 0, processing close to the post-process system is performed, i.e., each of the compressed chunks is stored in the first file system without the de-duplication determination being applied to all the compressed chunks in the primary de-duplication processing. In the secondary de-duplication processing, the de-duplication processing for all the compressed chunks is executed. In this way, the relational expression y=f(x) is a relational expression in which, as the remaining capacity x of the first file system increases, the threshold tends to decrease. The values a and b (a<b) may be arbitrary values.

According to this relational expression, when the remaining capacity of the first file system is small, the threshold y can be increased. As a result, the compressed chunks to be subjected to the de-duplication processing in the primary de-duplication processing increase. Therefore, it is possible to reduce a data amount stored in the first file system. On the other hand, when the remaining capacity of the first file system is large, it is possible to reduce the threshold y, reduce a ratio of the compressed chunks to be subjected to the de-duplication processing in the primary de-duplication processing, and improve response performance to a host. Consequently, it is possible to efficiently properly use the de-duplication processing in the primary de-duplication processing and the de-duplication processing in the secondary de-duplication processing according to a state of the storage apparatus 100.

The relational expression y=f(x) does not have to be the relational expression in which the threshold y decreases in a linear function manner between the value a and the value b as shown in FIG. 12. In short, the relational expression y=f(x) only has to be a relational expression in which, when the remaining capacity of the first file system increases, the threshold y decreases or has a tendency to decrease.

(1-4-2) Details of the Secondary De-Duplication Processing

FIG. 13 is a flowchart for explaining the secondary de-duplication processing according to this embodiment.

Details of the secondary de-duplication processing by the secondary de-duplication processing unit 202 are explained with reference to FIG. 13. The secondary de-duplication processing may be periodically executed at every predetermined time, may be executed at timing determined in advance, or may be executed according to an input of the administrator. Further, the execution may be started when the capacity of the first file system exceeds a fixed amount.

As shown in FIG. 13, first, the secondary de-duplication processing unit 202 substitutes 0 in the variable offset (S201). Subsequently, the secondary de-duplication processing unit 202 opens the primarily de-duplicated file (the first file system) and repeats, by the primarily de-duplicated file, the secondary de-duplication processing of a loop C (S204 to S221).

The secondary de-duplication processing unit 202 that opens the primarily de-duplicated file in step S202 reads data by the chunk header size from the value substituted in the variable offset (S204). The secondary de-duplication processing unit 202 acquires chunk length after compression from a value of the variable Length of the chunk header (S205). Further, the secondary de-duplication processing unit acquires a hash value (fingerprint) of the chunk from the variable FingerPrint of the chunk header (S206). When the primary duplication determination processing is not carried out yet in the primary de-duplication processing, an invalid value (null) is stored in FingerPrint of the chunk header.

Subsequently, the secondary de-duplication processing unit 202 checks a status (Status) included in the chunk header of the compressed chunk (S207). When the status is the status 1, i.e., when the target compressed chunk is not subjected to the duplication determination in step S207, the secondary de-duplication processing unit 202 executes processing in step S208 and subsequent steps. When the status is the status 2, i.e., when the target compressed chunk is subjected to the duplication determination by the primary de-duplication processing but the compressed chunk is absent in the chunk data set 122 in step S207, the secondary de-duplication processing unit 202 executes processing in step S216 and subsequent steps without executing the de-duplication processing. When the status is the status 3, i.e., when the target compressed chunk is subjected to the duplication determination by the primary de-duplication processing and the compressed chunk is present in the chunk data set 122 in step S207, the secondary de-duplication processing unit 202 executes the processing in step S216 without executing the de-duplication processing as in the status 2. Consequently, the secondary de-duplication processing is appropriately executed only when the target compressed chunk is not subjected to the duplication determination.

Processing performed when the status of the chunk header is the status 1, i.e., when the duplication determination is not carried out yet is explained. The secondary de-duplication processing unit 202 reads data for length obtained by adding the chunk header size to the value of offset (S208). The secondary de-duplication processing unit 202 calculates the hash value (FingerPrint) from the data of the compressed chunk read in step S208 (S209). The secondary de-duplication processing unit 202 substitutes the calculated hash value (FingerPrint) in the variable FingerPrint.

Subsequently, the secondary de-duplication processing unit 202 checks, on the basis of FingerPrint calculated in step S209, presence or absence of the compressed chunk of the chunk data set 122 (S210) and determines whether a compressed chunk same as the target compressed chunk is present in the chunk data set 122 (S211).

When it is determined in step S211 that the same compressed chunk is present in the chunk data set 122, the secondary de-duplication processing unit 202 substitutes an ID same as an already-stored chunk data set ID (ChunkDataSetID) of a storage destination of the same compressed chunk in the variable ChunkDataSetID (S212) and executes processing in step S220 and subsequent steps.

On the other hand, when it is determined in step S211 that the same compressed chunk is absent in the chunk data set 122, the secondary de-duplication processing unit 202 determines the chunk data set (ChunkDataSet) 122 at a storage destination of the compressed chunk and substitutes a chunk data set ID of the determined chunk data set 122 in the variable ChunkDataSetID (S213).

The secondary de-duplication processing unit 202 writes the chunk header and the data of the compressed chunk in the chunk data set (ChunkDataSet) 122 (S214). Further, the secondary de-duplication processing unit 202 registers, in the chunk index management table 125, the value substituted in the variable FingerPrint in step S209 and the value substituted in the variable ChunkDataSetID in step S213 (S215) and executes the processing in step S220 and subsequent steps.

Processing performed when the status of the chunk header is the statuses 2 and 3, i.e., when the duplication determination is already carried out is explained. The secondary de-duplication processing unit 202 acquires the chunk data set ID (ChunkDataSetID) from the chunk header and substitutes the chunk data set ID (ChunkDataSetID) in the variable ChunkDataSetID (S224). The secondary de-duplication processing unit 202 executes the processing in step S220 and subsequent steps. When the status is the status 2, the chunk data set ID (ChunkDataSetID) stored in the chunk header is an ID indicating a writing destination in which the compressed chunk is written in S135. When the status is the status 3, the chunk data set ID (ChunkDataSetID) stored in the chunk header is an ID indicating a storage destination of data same as the data de-duplicated in the primary de-duplication processing, which is already-stored data (compressed chunk). Note that, in the case of the status 2, the secondary de-duplication processing unit 202 stores Finger Print and Chunk Data Set ID in the chunk index.

The secondary de-duplication processing unit 202 configures, in the content management table 124, chunk length (Length), offset (Offset), a fingerprint (FingerPrint), a chunk data set ID (ChunkDataSetID) (S220). The secondary de-duplication processing unit 202 adds the size of the chunk header and the chunk length (Length) to the value of the variable Offset and substitutes an added-up value in the variable Offset (S221).

After repeating, by the size of the primarily de-duplicated file, the processing of the loop C in steps S204 to S221, the secondary de-duplication processing unit 202 closes the primarily de-duplicated file (S223) and ends the secondary de-duplication processing.

In this embodiment, the comparison processing for the compression ratio of the chunk and the threshold is performed. However, the comparison processing is not limited to this. The size of the chunk after the compression and a threshold may be compared. The size of the chunk, which is not compressed, and a threshold may be compared.

Further, in this embodiment, the compressed chunk subjected to the de-duplication determination by the primary de-duplication processing unit 201 in the primary de-duplication processing is not stored in the primary file system irrespective of whether the compressed chunk is successfully de-duplicated. However, the compressed chunk subjected to the de-duplication determination by the primary de-duplication processing unit 201 and not successfully de-duplicated may be primarily stored in a primary file system. The chunk stored in a primary file system may be read by the secondary de-duplication processing unit and stored in a secondary file system.

(1-5) Details of Read Processing

Figure 14:
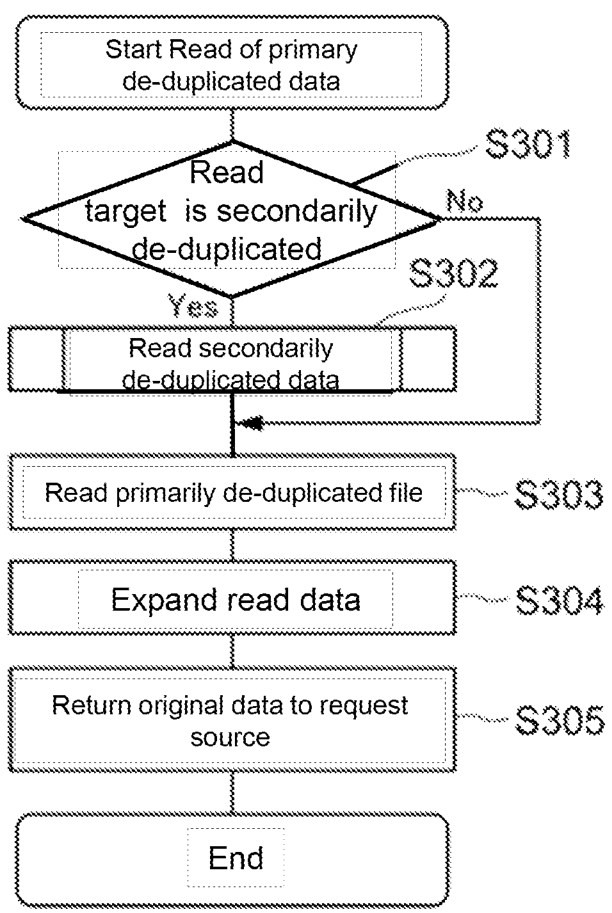
FIG. 14 is a flowchart for explaining Read processing for data according to the first embodiment.

FIG. 14 is a flowchart for explaining Read processing for data according to this embodiment. Read processing for de-duplicated data is performed by the primary de-duplication processing unit 201 and the secondary de-duplication processing unit 202.

As shown in FIG. 14, first, the primary de-duplication processing unit 202 determines whether a Read target is secondarily de-duplicated data (S301). For example, when the data is stubbed, the primary de-duplication processing unit 202 determines that the data is secondarily de-duplicated data.

When it is determined in step S301 that the Read target data is secondarily de-duplicated, the primary de-duplication processing unit 201 executes the Read processing for the secondarily de-duplicated data (S302). On the other hand, when it is determined in step S301 that the Read target data is not secondarily de-duplicated, the primary de-duplication processing unit 201 executes processing in step S303 and subsequent steps.

Figure 15:
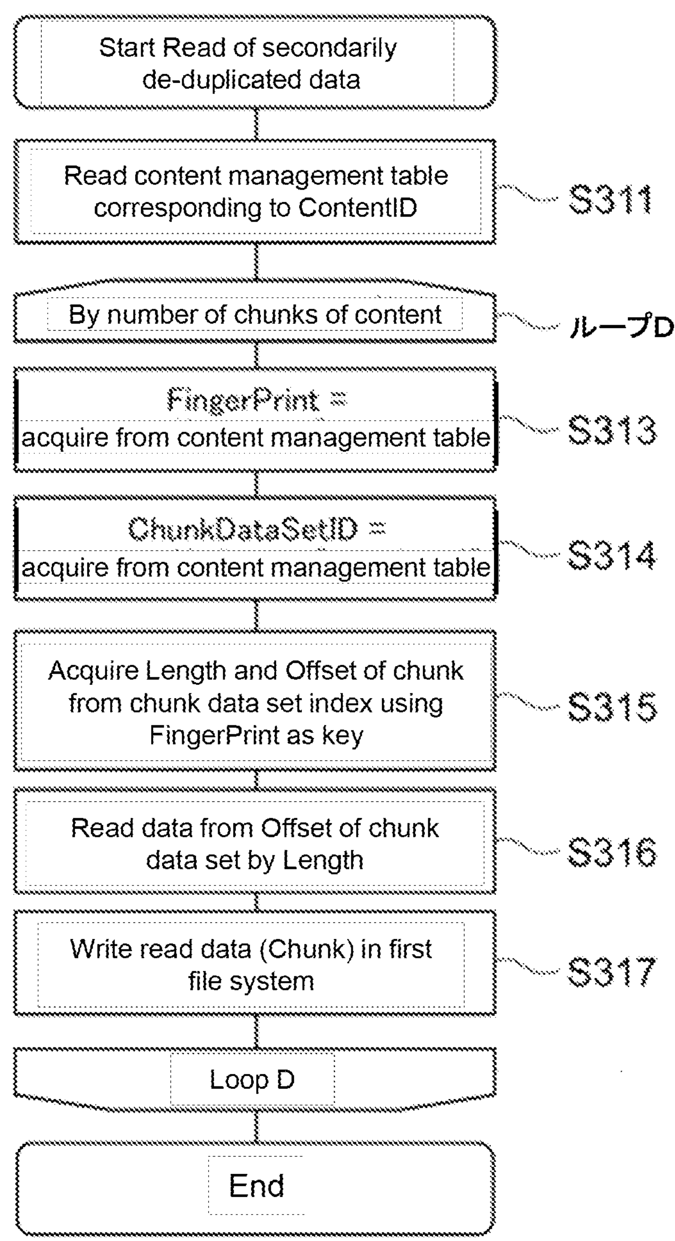
FIG. 15 is a flowchart for explaining the Read processing for data according to the first embodiment.

Details of the Read processing for the secondarily de-duplicated data according to this embodiment are shown in FIG. 15. As shown in FIG. 15, the secondary de-duplication processing unit 202 reads the content management table 124 corresponding to a content ID (content ID) of content data (S311).

The secondary de-duplication processing unit 202 repeated, by the number of chunks of content, processing of a loop D in steps S313 to S317.

First, the secondary de-duplication processing unit 202 acquires the finger print (FingerPrint) from the content management table 124 (S313). Further, the secondary de-duplication processing unit 202 acquires the chunk data set ID (ChunkDataSetID) from the content management table 124 (S314).

The secondary de-duplication processing unit 202 acquires, using the fingerprint (FingerPrint) acquired in step S313 as a key, chunk length (Length) and offset (Offset) of the chunk from the chunk data set index (ChunkDataSetIndex) 123 (S315).

The secondary de-duplication processing unit 202 reads data for the chunk length (Length) from the offset (Offset) of the chunk data set acquired in step S315 (S316). The secondary de-duplication processing unit 202 writes the compressed chunk data read in step S316 in the first file system (S317).

Referring back to FIG. 14, after the Read processing for the secondarily de-duplicated data is executed in step S302, the primary de-duplication processing unit 201 reads a primarily de-duplicated file (S303).

The primary de-duplication processing unit 201 expands the data read in step S303 (S304). The primary de-duplication processing unit 201 returns the original data before the compression to a data request source such as the host apparatus 200 that requests the data (S305). The Read processing for the de-duplicated data is explained above.

(1-6) Effect of this Embodiment

As explained above, according to this embodiment, the primary de-duplication processing unit 201 divides data from the host apparatus 200 into one or two or more chunks, compresses the divided chunks, when a compression ratio of a chunk is lower than the predetermined threshold, calculates a hash value of the compressed chunk, compares the hash value and a hash value of the data already stored in the HDD 104, and executes the first de-duplication processing. When the compression ratio of a chunk is larger than the predetermined threshold, after storing the compressed chunk is the first file system, the secondary de-duplication processing unit 202 calculates a hash value of the compressed chunk, compares the hash value with the hash value of the data already stored in the HDD 104, and executes the secondary de-duplication processing. Further, the threshold is changed according to a state of the storage apparatus, i.e., the remaining capacity of the first file system. Therefore, when the remaining capacity of the first file system is small, the threshold can be increased. As a result, the de-duplication processing in the primary de-duplication processing is performed. Therefore, it is possible to reduce a data amount stored in the first file system. On the other hand, when the remaining capacity of the first file system is large, the threshold can be reduced. Therefore, it is possible to reduce a ratio of the execution of the de-duplication processing in the primary de-duplication processing and improve response performance to the host. Consequently, it is possible to efficiently properly use the de-duplication processing in the primary de-duplication processing and the de-duplication processing in the secondary de-duplication processing according to the state of the storage apparatus. Specifically, when the threshold is set as a fixed value, even when the remaining capacity of the first file system is large, it is possible to appropriately prevent the first de-duplication from being applied to a large number of chunks. Even when there is little remaining capacity of the first file system, it is possible to appropriately prevent the first de-duplication processing from not being executed on most of the chunks.

(2) Second Embodiment

A second embodiment is explained. In the following explanation, detailed explanation is omitted concerning components same as those in the first embodiment. Components different from those in the first embodiment are explained particularly in detail. Since a hardware configuration of a computer system is the same as that in the first embodiment, detailed explanation of the hardware configuration is omitted.

A storage apparatus according to the second embodiment is different from the storage apparatus according to the first embodiment in threshold determination processing by the threshold determination processing 204. In the second embodiment, a threshold is determined on the basis of information indicating a load of secondary de-duplication processing, which is an example of a state of the storage apparatus. The information indicating the load of the secondary de-duplication processing may be an amount of data to be de-duplicated in the secondary de-duplication processing, the number of determinations of the de-duplication, or a value to be calculated from these.

(2-1) Details of the Threshold Determination Processing

Figure 16:
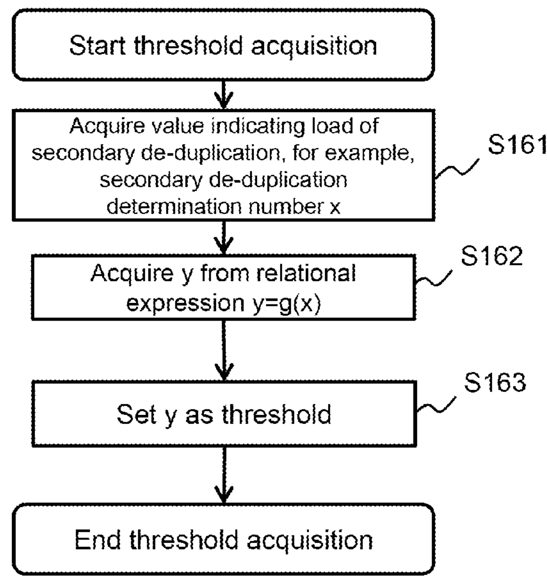
FIG. 16 is a flowchart for explaining threshold determination processing according to a second embodiment.

Details of the threshold determination processing by the threshold determination processing unit 204 is explained with reference to FIG. 16. In this embodiment, the threshold determination processing unit 204 is invoked and executed during the primary de-duplication processing (S126 in FIG. 10). However, the threshold determination processing unit 204 may be executed at timing determined in advance or may be executed according to an input of an administrator.

Figure 17:
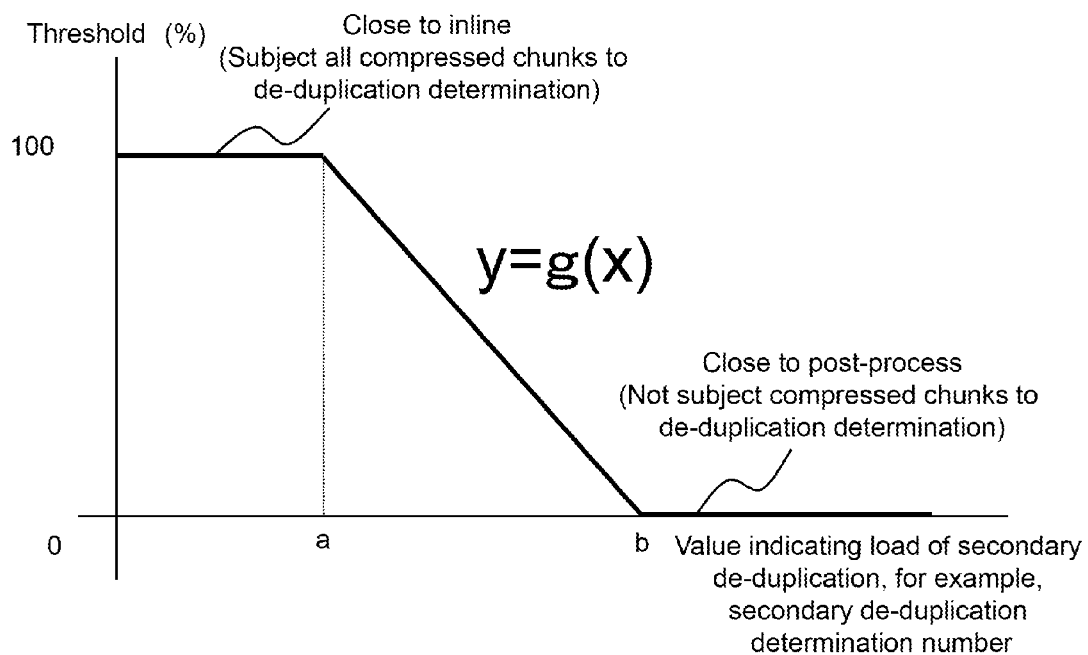
FIG. 17 is a diagram for explaining a threshold according to the second embodiment.

The threshold determination processing unit 204 acquires a value indicating the load of the secondary de-duplication processing, for example, a secondary de-duplication determination number x y inquiring the secondary de-duplication processing unit 202 about the same (S161). The secondary de-duplication determination number x means, for example, the number of files not subjected to the secondary duplication determination processing at a point when the secondary de-duplication processing unit 202 receives the inquiry. However, the secondary de-duplication determination number x is not limited to this and only has to be a value indicating the load of the secondary de-duplication processing unit. Subsequently, the threshold determination processing unit 204 acquires the threshold y from the relational expression y=g(y) (S162), sets the threshold y as a threshold used in step S127 (S163), and ends the threshold determination processing. In the relational expression y=g(x), for example, as shown in FIG. 17, the threshold y is 100 when the secondary de-duplication determination number x is between 0 and a value a. When the threshold y is 100, processing close to the inline system is executed, i.e., the primary de-duplication processing is executed on all the chunks. The relational expression y=g(x) has a correspondence relation that, when the secondary de-duplication determination number x is between the value a and a value b, for example, when the secondary de-duplication determination number x increases, the threshold y decreases (e.g., decreases in a linear function manner). In the relational expression y=g(x), when the secondary de-duplication determination number x is equal to or larger than the value b, the threshold y is 0. When the threshold y is 0, processing close to the post-process system, i.e., processing for storing each of the chunks in the first file system without applying the de-duplication determination to all the chunks. In this way, the relational expression y=g(x) is a relational expression in which, as the secondary de-duplication determination number x increases, the threshold y tends to decrease. The values a and b (a<b) may be configured to arbitrary values according to, for example, a state of use of the storage apparatus 100.

In both the secondary de-duplication processing and the primary de-duplication processing, metadata in the second file system is accessed to execute the duplication determination processing. Therefore, the primary de-duplication processing also substantially affects performance of the secondary de-duplication processing. Therefore, when the load of the secondary de-duplication processing is high, it is necessary to reduce a load of the primary de-duplication processing. Therefore, according to this relational expression, when the secondary de-duplication determination number is small, the threshold y can be increased. As a result, it is possible to effectively execute the de-duplication processing in the primary de-duplication processing. On the other hand, when the secondary de-duplication determination number is large, the threshold y can be reduced. Therefore, it is possible to prevent the de-duplication processing in the primary de-duplication processing from being executed and improve processing performance of the secondary de-duplication processing. Consequently, it is possible to efficiently properly use the de-duplication processing in the primary de-duplication processing and the de-duplication processing in the secondary de-duplication processing according to the state of the storage apparatus. For example, when the secondary de-duplication processing is often executed, it is possible to appropriately prevent a situation in which the primary de-duplication processing from is executed on a large number of chunks and the execution of the secondary de-duplication processing is delayed.

The relational expression y=g(x) does not have to be the relational expression in which the threshold y decreases in a linear function manner between the value a and the value b as shown in FIG. 17. In short, the relational expression y=g(x) only has to be a relational expression in which, when the secondary de-duplication determination number is larger, the threshold y decreases or has a tendency to decrease.

(3) Third Embodiment

A third embodiment is explained. In the following explanation, detailed explanation is omitted concerning components same as those in the first embodiment. Components different from those in the first embodiment are explained particularly in detail. Since a hardware configuration of a computer system is the same as that in the first embodiment, detailed explanation of the hardware configuration is omitted.

A storage apparatus according to the third embodiment is different from the storage apparatus according to the first embodiment in threshold determination processing by the threshold determination processing 204. In the third embodiment, a threshold is determined on the basis of a ratio of the number of compressed chunks de-duplicated in primary de-duplication processing and the number of all compressed chunks, which is an example of a state of the storage apparatus. This embodiment is devised on the basis of the knowledge that, when the number of compressed chunks de-duplicated in the primary de-duplication processing and the number of all compressed chunks are close to a predetermined value, performance speed of primary de-duplication of the primary de-duplication processing and secondary de-duplication processing of secondary de-duplication processing as a whole is the best. The predetermined value is referred to as target value.

(3-1) Details of the Threshold Determination Processing

Figure 18:
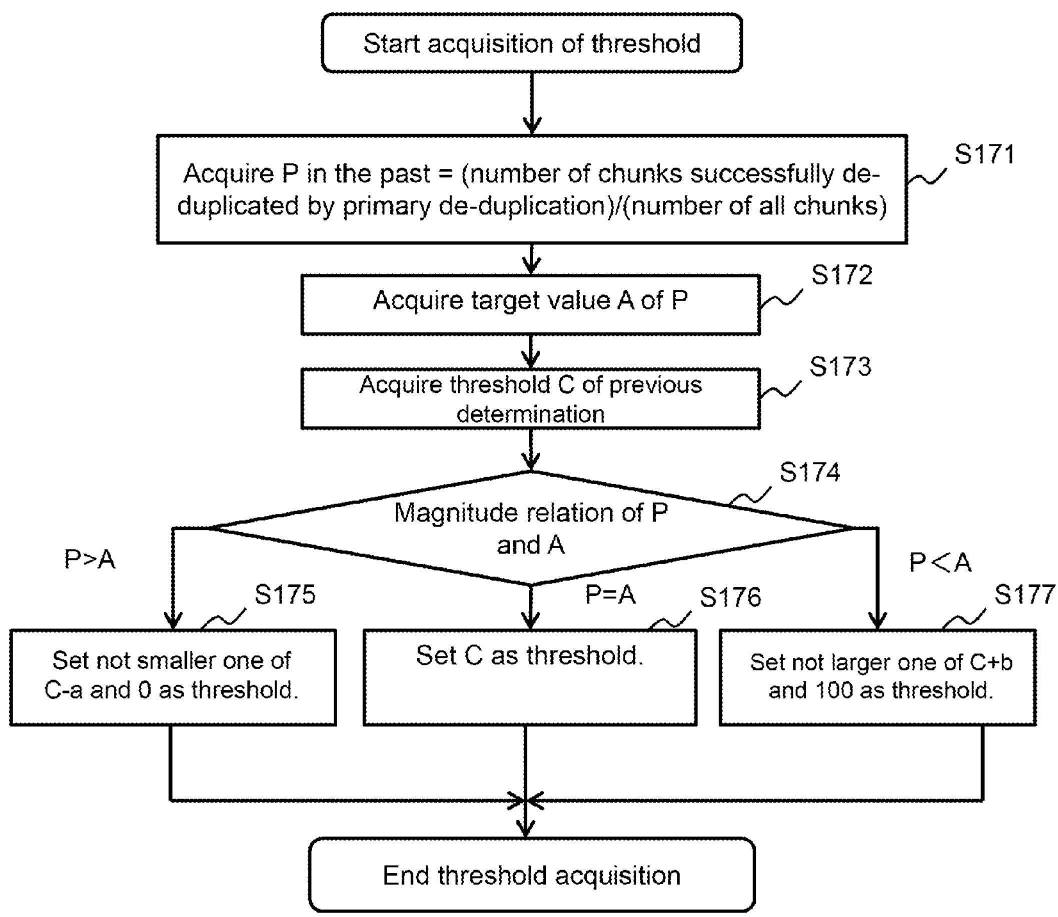
FIG. 18 is a flowchart for explaining threshold determination processing according to a third embodiment.

Details of the threshold determination processing by the threshold determination processing unit 204 is explained with reference to FIG. 18. In this embodiment, the threshold determination processing unit 204 is invoked and executed during the primary de-duplication processing (S126 in FIG. 10). However, the threshold determination processing unit 204 may be executed at timing determined in advance or may be executed according to an input of an administrator.

The threshold determination processing unit 204 divides the number of compressed chunks successfully de-duplicated in the primary de-duplication processing in the past by the number of all compressed chunks and acquires a ratio P in the past (S171). As the number of compressed chunks successfully de-duplicated in the primary de-duplication processing in the past, the number of compressed chunks from the start of the operation of the storage apparatus 100 to the present point may be a target or the number of compressed chunks in a predetermined range in the past (e.g., one month in the past) may be a target. Subsequently, the threshold determination processing unit 204 acquires a target value A (S172). The target value A may be, for example, a value grasped by operating the storage apparatus 100. Subsequently, the threshold determination processing unit 204 acquires a threshold C used for the previous determination (S173).

Subsequently, the threshold determination processing unit 204 determines a magnitude relation between the ratio P and the target value A (S174). As a result, when the ratio P is larger than the target value A (S174: P>A), the threshold determination processing unit 204 sets not smaller one of the previous threshold C−a value a and 0 as a threshold to be used this time (S175) and ends the processing. The value a may be an arbitrary value. Consequently, it is possible to reduce the threshold smaller than the previous threshold, set the ratio P closer to the target value A by suppressing an increase in the number of compressed chunks de-duplicated in the primary de-duplication processing, and improve comprehensive performance of the primary de-duplication of the primary de-duplication processing and the secondary duplication cancellation processing of the secondary de-duplication.

When the ratio P is equal to the target value A (S174: P=A), the threshold determination processing unit 204 sets the previous threshold C as the threshold to be used this time (S176) and ends the processing. Consequently, it is possible to relatively maintain the ratio P to be equal to the target value A by setting the threshold same as the previous threshold and maintaining a ratio of an increase in the number of compressed chunks that can be de-duplicated in the primary de-duplication processing and maintain performance of the primary de-duplication of the primary de-duplication processing and the secondary duplication cancellation processing of the secondary de-duplication.

When the ratio P is smaller than the target value A (S174: P<A), the threshold determination processing unit 204 sets not larger one of the previous threshold C+a value b and 100 as a threshold to be used this time (S177) and ends the processing. The value b may be an arbitrary value. Consequently, it is possible to set a threshold to be used next larger than the previous threshold, set the ratio P closer to the target value A by facilitating an increase in the number of compressed chunks that can be de-duplicated in the primary de-duplication processing, and improve performance of the primary de-duplication of the primary de-duplication processing and the secondary duplication cancellation processing of the secondary de-duplication as a whole. By using the threshold determined by this threshold determination processing, it is possible to carry out the post-process system for the compressed chunk when the post-process system is allowable and carry out the inline system for the compressed chunk when the post-process system is not allowable.

In the example explained above, the threshold is increased or reduced by the predetermined value. However, a method of increasing or reducing the threshold is not limited to this. In the example explained above, the threshold is the ratio of the number of compressed chunks successfully de-duplicated in the primary de-duplication processing to the number of all compressed chunks. However, the threshold may be, for example, a ratio of the number of compressed chunks for which the de-duplication is determined in the primary de-duplication processing or may be a ratio of the number of compressed chunks successfully de-duplicated (or for which the de-duplication is determined) in the primary de-duplication processing to the number of compressed chunks for which the de-duplication is determined in the secondary de-duplication processing. In short, the threshold only has to be a ratio concerning the number of compressed chunks for which the de-duplication is determined in the primary de-duplication processing in the processing. Consequently, it is possible to increase performance speed of the primary de-duplication of the primary de-duplication processing and the secondary de-duplication of the secondary de-duplication processing as a whole.

As another embodiment, the threshold may be changed according to response performance of the storage apparatus 100 to a host computer. That is, a relational expression y=h(x) (y: threshold, x: response performance) is configured as explained below. When the response performance is high, the threshold determination processing unit 204 increases the threshold in order to increase the number of compressed chunks that can be de-duplicated in the primary de-duplication processing. When the response performance is low, the threshold determination processing unit 204 reduces the threshold in order to reduce the number of compressed chunks that can be de-duplicated in the primary de-duplication processing. By configuring the threshold in this way, it is possible to adjust, according to the response performance, the number of compressed chunks that can be de-duplicated in the primary de-duplication processing. Therefore, it is possible to efficiently concurrently use the duplication determination in the primary de-duplication processing and the duplication determination in the secondary de-duplication processing.

(4) Fourth Embodiment

A fourth embodiment is explained with reference to FIG. 19. In the following explanation, detailed explanation is omitted concerning components same as those in the first embodiment. Components different from those in the first embodiment are explained particularly in detail. Since a hardware configuration of a computer system is the same as that in the first embodiment, detailed explanation of the hardware configuration is omitted.

(4-1) Software Configurations of a Host Apparatus and a Storage Apparatus

Figure 19:
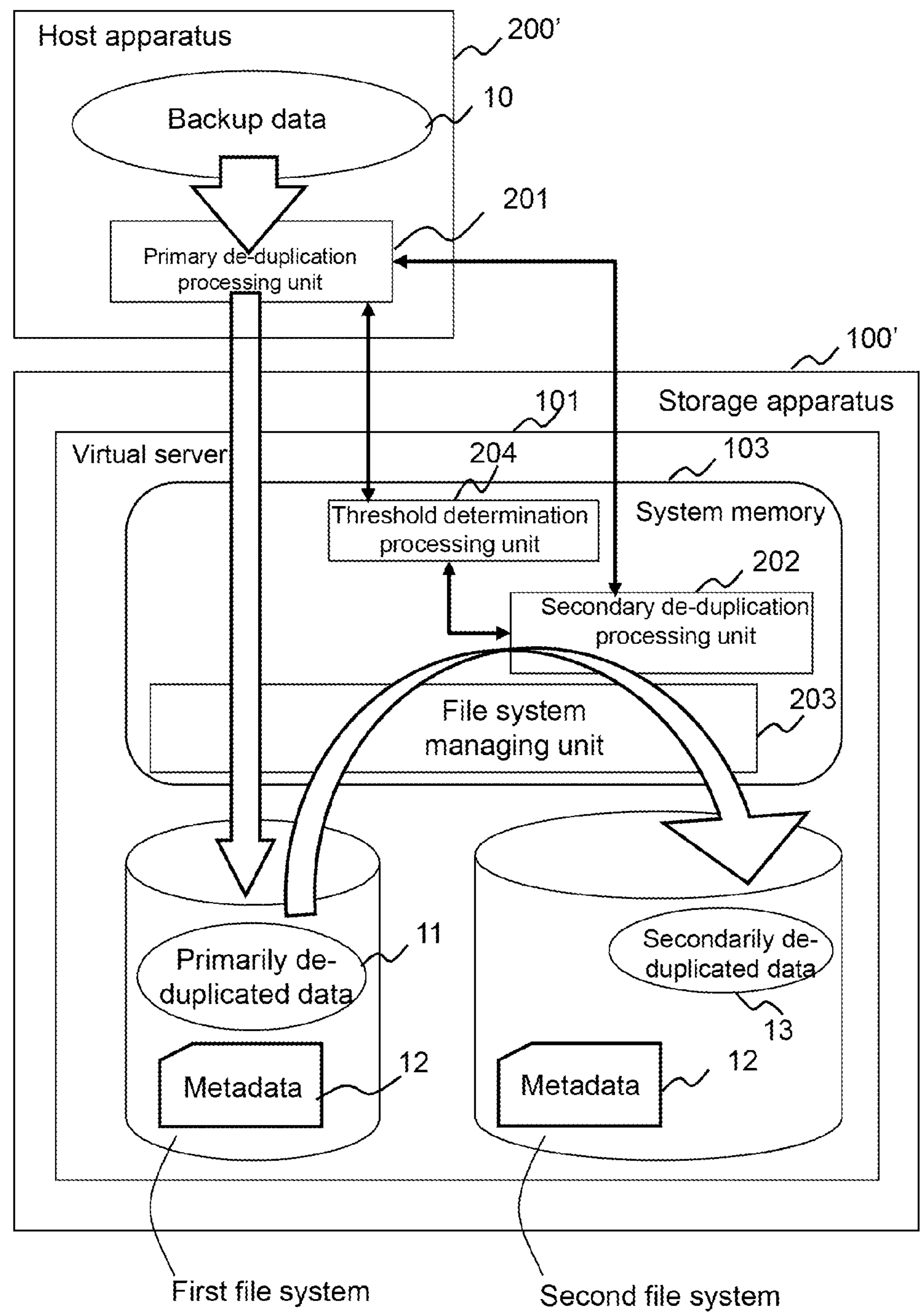
FIG. 19 is a block diagram showing a software configuration of a storage apparatus according to a fourth embodiment.

In this embodiment, as shown in FIG. 19, the primary de-duplication processing unit 201 is provided in a host apparatus 200'. The secondary de-duplication processing unit 202 and the threshold determination processing unit 204 are provided in a storage apparatus 100'. The host apparatus 200' may be a server such as a backup server or other storage apparatuses.

By executing primary de-duplication processing in the host apparatus 200' in this way, it is possible to reduce a data amount from the host apparatus 200' to the storage apparatus 100' during backup of data. For example, when a processing ability of the host apparatus 200' is high and a transfer ability between the host apparatus 200' and the storage apparatus 100' is low, it is desirable to configure the host apparatus 200' and the storage apparatus 100' as in this embodiment.

REFERENCE SIGNS LIST

100 Storage apparatus
101 Virtual server
103 System memory
105 Fiber channel port
106 Fiber channel cable
110 Disk array apparatus
121 Stub file
122 Chunk data set
123 Chunk data set index
124 Content management table
125 Chunk index
200 Host apparatus
201 Primary de-duplication processing unit
202 Secondary de-duplication processing unit
203 File system managing unit
204 Threshold determination processing unit

The invention claimed is:

1. A storage device comprising:

an interface;

a storing apparatus related to a first storage area and a second storage area; and a control unit configured to determine, on the basis of a result of comparison of a compression ratio of data received via the interface with a threshold, whether first duplication determination for determining whether data same as the data compressed without being stored in the first storage area is stored in the second storage area is executed or second duplication determination for determining whether data same as the data compressed after being stored in the first storage area is stored in the second storage area is executed, wherein the control unit is configured to change the threshold on the basis of a state of the storage device, and wherein the control unit is configured to execute the first duplication determination on the compressed data when the compression ratio is smaller than the threshold and execute the second duplication determination on the compressed data when the compression ratio is equal to or larger than the threshold.

2. A storage device according to claim 1, wherein the state of the storage device refers to a remaining capacity of the first storage area, and wherein the control unit is configured to change the threshold according to the remaining capacity of the first storage area.

3. A storage device according to claim 2, wherein the control unit tends to determine the threshold to be a smaller value as the remaining capacity of the first storage area is larger.

4. A storage device according to claim 2, wherein the control unit tends to determine the threshold to be a larger value as the remaining capacity of the first storage area is smaller.

5. A storage device according to claim 4, wherein the compression ratio is a ratio of a data amount reduced by data compression.

6. A storage device according to claim 5, wherein, when determining whether data same as the compressed data is stored in the second storage area, the control unit is configured to compare a hash value of the compressed data with a hash value of the data stored in the second storage area.

7. A storage device according to claim 1, wherein the state of the storage device refers to a load of the second duplication determination.

8. A storage device according to claim 7, wherein the control unit tends to determine the threshold to be a smaller value as the load of the second duplication determination is larger.

9. A storage device according to claim 1, wherein the state of the storage device refers to a predetermined ratio related to a number of pieces of compressed data de-duplicated in the first duplication determination and a number of pieces of all compressed data.

10. A storage device according to claim 9, wherein the control unit is configured to reduce the threshold when a ratio of the number of pieces of compressed data de-duplicated in the first duplication determination to the number of pieces of all compressed data is smaller than a predetermined target value, increase the threshold when the ratio of the number of pieces of compressed data de-duplicated in the first duplication determination to the number of pieces of all compressed data is larger than the predetermined target value, and maintain the threshold unchanged when the ratio of the number of pieces of compressed data de-duplicated in the first duplication determination to the number of pieces of all compressed data is equal to the predetermined target value.

11. A storage device according to claim 1, wherein the state of the storage device refers to response performance with respect to a host computer.

12. A storage device according to claim 11, wherein the control unit tends to determine the threshold to be a larger value as the response performance is higher.

13. A data management method for data in a storage device, the method comprising:

executing comparison of a compression ratio of compressed data with a threshold;

determining, on the basis of a result of the comparison, whether first duplication determination for determining whether data same as the data compressed without being stored in a first storage area is stored in a second storage area is executed or second duplication determination for determining whether data same as the data compressed after being stored in the first storage area is stored in the second storage area is executed;

changing the threshold on the basis of a state of the storage device; and executing the first duplication determination on the compressed data when the compression ratio is smaller than the threshold and executing the second duplication determination on the compressed data when the compression ratio is equal to or larger than the threshold.

* * * * *